US010785008B2

(12) United States Patent
Garcia et al.

(10) Patent No.: US 10,785,008 B2
(45) Date of Patent: Sep. 22, 2020

(54) DETERMINING ONE OR MORE DATA MODULATION PROFILES FOR ONE OR MORE DEVICES

(71) Applicant: Comcast Cable Communications, LLC, Philadelphia, PA (US)

(72) Inventors: Maurice Garcia, Levittown, PA (US); Larry Wolcott, Denver, CO (US); Robert Gonsalves, Aurora, CO (US); Michael Pettit, Ardmore, PA (US); John Bevilacqua, Boulder, CO (US); Jorge Salinger, West Palm Beach, FL (US); Saifur Rahman, Cinnaminson, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 40 days.

(21) Appl. No.: 15/349,523

(22) Filed: Nov. 11, 2016

(65) Prior Publication Data

US 2017/0141887 A1 May 18, 2017

Related U.S. Application Data

(60) Provisional application No. 62/398,102, filed on Sep. 22, 2016, provisional application No. 62/254,988, filed on Nov. 13, 2015.

(51) Int. Cl.
*H04L 1/00* (2006.01)
*H04L 5/00* (2006.01)
(Continued)

(52) U.S. Cl.
CPC ............ *H04L 5/006* (2013.01); *H04L 1/0005* (2013.01); *H04L 41/0893* (2013.01);
(Continued)

(58) Field of Classification Search
CPC ....... H04L 5/006; H04L 1/0005; H04L 43/16; H04L 2025/0342
See application file for complete search history.

(56) References Cited

U.S. PATENT DOCUMENTS 7,272,190 B2 * 9/2007 Blankenship ......... H04L 1/0003
370/208
7,428,270 B1 * 9/2008 Dubuc ................ H04L 27/0012
375/224

(Continued)

OTHER PUBLICATIONS

"Standard Deviation" from Wikipedia—Accessed May 2, 2016; https://en.wikipedia.org/wiki/Standard_deviation.
(Continued)

*Primary Examiner* — Abdelnabi O Musa
(74) *Attorney, Agent, or Firm* — Banner & Witcoff, Ltd.

(57) ABSTRACT

Described herein is a system and method for determining one or more data modulation profiles for one or more devices. The system and method described herein may measure signal quality, such as a modulation error ratio (MER), signal-to-noise ratio (SNR), receive power, transmit power, etc. Based on the signal quality, the system may determine one or more data modulation profile(s) (e.g., quadrature amplitude modulation (QAM) profiles) for a subcarrier, a plurality of subcarriers, a device, and/or a grouping of devices.

20 Claims, 27 Drawing Sheets

(51) Int. Cl.
  H04L 12/26 (2006.01)
  H04L 12/24 (2006.01)
  H04L 25/03 (2006.01)
(52) U.S. Cl.
  CPC .......... *H04L 43/16* (2013.01); *H04L 41/0213* (2013.01); *H04L 43/0823* (2013.01); *H04L 43/10* (2013.01); *H04L 2025/0342* (2013.01)

(56) References Cited

U.S. PATENT DOCUMENTS

| | | | | | |
|---|---|---|---|---|---|
| 2010/0303141 | A1* | 12/2010 | Yeo | ...................... | H04B 1/7075 375/227 |
| 2014/0177687 | A1* | 6/2014 | Seol | .......................... | H04L 1/18 375/219 |
| 2015/0188653 | A1* | 7/2015 | Hanks | .................. | H04J 11/0023 370/203 |
| 2015/0188668 | A1* | 7/2015 | Al-banna | .............. | H04L 1/0668 370/208 |

OTHER PUBLICATIONS

CableLabs; "Non-Profit Innovation and R&D Lab," Specifications—Accessed Sep. 19, 2016; http://www.cablelabs.com/specs/.

"Skewness" from Wikipedia—Accessed May 2, 2016—https://en.wikipedia.org/wiki/Skewness.

"Shannon-Hartley Theorem" from Wikipedia; Accessed May 2, 2016; https://en.wikipedia.org/wiki/Shannon%E2%80%93Hartley_theorem.

"Modulation Error Ratio" from Wikipedia; Accessed May 2, 2016; https://en.wikipedia.org/wiki/Modulation_error_ratio.

CableLabs, "Data-Over-Cable Service Interface Specifications Technical Reports: Midsplit Migration Implications on the HFC Network Technical Report—CM-TR-MID-SPLIT-V01-150223" Dated Feb. 23, 2015.

CableLabs; "Data-Over-Cable Service Interface Specifications DOCSIS 3.1—Security Specification—CM-SP-SECv3.1-I06-160602;" Dated Jun. 2, 2016.

CableLabs; "Data-Over-Cable Service Interface Specifications DOCSIS 3.1—Physical Layer Specification—CM-SP-PHYv3.1-I09-160602;" Dated Jun. 2, 2016.

CableLabs; "Data-Over-Cable Service Interface Specifications DOCSIS 3.1—MAC and Upper Layer Protocols Interface Specification—CM-SP-MULPIv3.1-I09-160602;" Dated Jun. 2, 2016.

CableLabs; "Data-Over-Cable Service Interface Specifications DOCSIS 3.1—Cable Modem Operations Support System Interface Specification—CM-SP-CM-ISSIv3.1-I07-160602;" Dated Jun. 2, 2016.

CableLabs; "Data-Over-Cable Service Interface Specifications DOCSIS 3.1—CCAP Operations Support System Interface Specification—CM-SP-CCAP-OSSIv3.1-I07-160602;" Dated Jun. 2, 2016.

"Channel Capacity" from Wikipedia; Accessed May 2, 2016; https://en.wikipedia.org/wiki/Channel_capacity.

Kliger, Avi and Nicola Varanese, "PHY Link Channel;" IEEE 802.3bn; Mar. 18-21, 2013.

CableLabs; "Data-Over-Cable Service Interface Specifications DOCSIS 3.1—Cable Modem Operations Support System Interface Specification—CM-SP-CM-OSSIv3.1-I05-150910;" Dated Sep. 10, 2015.

Pantelias, Niki; "Monitoring the Variable Network: Impact of DOCSIS 3.1 on Plant Utilization Metrics;" Broadcom Corporation; 2015 Spring Technical Forum Proceedings.

* cited by examiner

DETERMINING ONE OR MORE DATA MODULATION PROFILES FOR ONE OR MORE DEVICES

CROSS-REFERENCE TO RELATED APPLICATIONS

This application claims priority to U.S. Provisional Patent Application Ser. No. 62/254,988, filed Nov. 13, 2015 and entitled "Generation and Distribution of Multiple Data Modulation Profiles," and claims priority to U.S. Provisional Patent Application Ser. No. 62/398,102, filed Sep. 22, 2016 and entitled "Determining One or More Data Modulation Profiles for Groups of Devices." The prior applications are incorporated herein by reference in their entirety.

BACKGROUND

A single, uniform data modulation profile may be used to send downstream transmissions to (or to receive upstream transmissions from) devices. Each stream might need to be compatible with each device in its path. The single modulation profile may also be manually configured by an operator.

SUMMARY

This summary is not intended to identify critical or essential features of the disclosures herein, but instead merely summarizes certain features and variations thereof. Other details and features will also be described in the sections that follow.

Described herein is a system and method for using multiple (e.g., mixed) modulation profiles for user devices. The multiple modulation profiles may be sent to the user devices, and the profiles may be used by the user devices for sending (or receiving) different downstream (or upstream) transmissions. Modulation profiles may be customized for each user device and/or each user device group (e.g., service group).

Systems and methods for generating and distributing multiple modulation profiles are described. A user device may measure at least one of a downstream or an upstream signal quality of the user device. The downstream or the upstream signal quality may comprise at least one of a modulation error ratio (MER), a signal to noise ratio (SNR), a receive power, a transmit power, etc. Data indicating the at least one of the downstream or the upstream signal quality of the user device may be received from the user device.

Based on an analysis of the data indicating the at least one of the downstream or the upstream signal quality of the user device, a computing device may determine a modulation profile for the user device. Determining the modulation profile may be performed in response to a determination of wireless signal ingress affecting the downstream or an upstream signal quality of the user device exceeding a threshold. Additionally or alternatively, determining the modulation profile may comprise modifying a characteristic of a physical layer between the user device and a termination system.

In some aspects, determining the modulation profile may comprise increasing or decreasing an order of modulation of upstream signals transmitted by the user device or downstream signals received by the user device. The order of modulation may comprise one or more of Quadrature Phase Shift Keying (QPSK), 16 Quadrature Amplitude Modulation (QAM), 64 QAM, 256 QAM, 512 QAM, 1024 QAM, 2048 QAM, 4096 QAM, 16K QAM, etc. An instruction may be sent to the user device to change to the new modulation profile.

Described herein is a system and method for grouping devices (e.g., end-user devices) into modulation groups (e.g., QAM groups) based one or more indicator of data error rate, such as MER, SNR, or any other indicator of error rate or signal quality. Aspects described herein may be used to determine groups of devices having a tight fit (e.g., within one standard deviation or other threshold), and assign each group of devices a particular profile and/or group of channels or subchannels.

The method may comprise collecting data, e.g., MER (or other error rate) data from each device in a group, such as a service group. The mean value of the MER of each device subcarrier may be calculated. The system may perform a standard deviation function on each device MER. In some aspects, the system may determine whether any data is skewed, and remove the device having the skewed data from a potential grouping of devices. The system may perform separate analysis and/or grouping for skewed data.

The MER data for the remaining devices may be inserted into a device population list. A standard deviation function may be performed on each subcarrier group. A standard deviation function may also be performed on the serving group (e.g., for all of the devices in the serving group). Based on the standard deviations, the devices may be grouped and assigned different modulation profiles. In some aspects, the Shannon-Harley Capacity Theorem may be used to maximize channel capacity.

The foregoing methods and other methods described herein may be performed by a system, a computing device, a computer readable medium storing computer-executable instructions for performing the methods, and/or an apparatus having a processor and memory storing computer-executable instructions for performing the methods.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
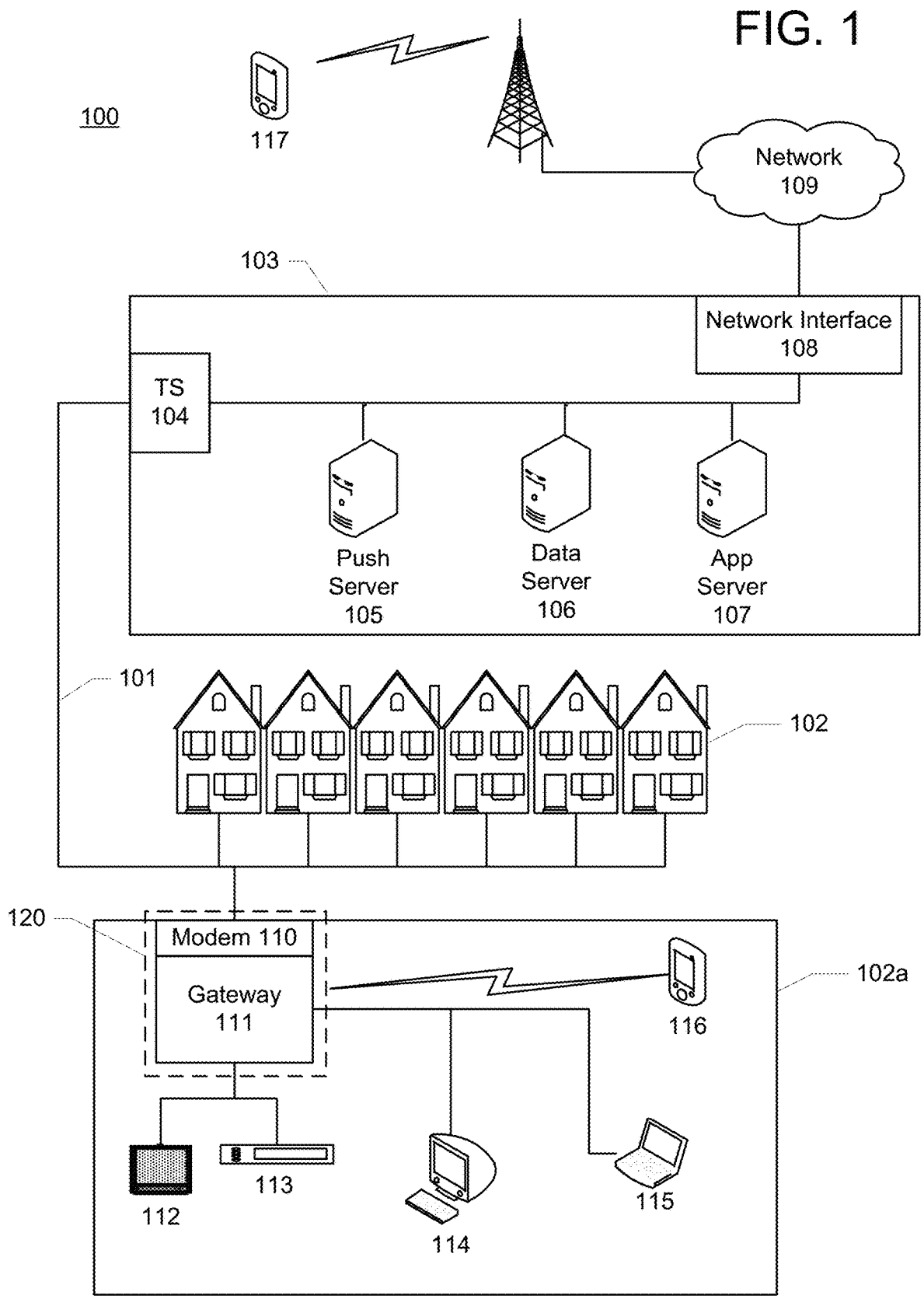
FIG. 1 illustrates an example information access and distribution network.

FIG. 1 illustrates an example information access and distribution network 100 on which many of the various features described herein may be implemented. The network 100 may be any type of information distribution network, such as satellite, telephone, cellular, wireless, etc. One example may be an optical fiber network, a coaxial cable network or a hybrid fiber/coax (HFC) distribution network. Such networks 100 use a series of interconnected communication links 101 (e.g., coaxial cables, optical fibers, wireless connections, etc.) to connect multiple premises, such as locations 102 (e.g., homes, businesses, institutions, etc.), to a local office 103 (e.g., a central office or headend). The local office 103 may transmit downstream information signals onto the links 101, and each location 102 may have a receiver used to receive and process those signals.

There may be one link 101 originating from the local office 103, and it may be split a number of times to distribute the signal to various locations 102 in the vicinity (which may be many miles) of the local office 103. Although the term home is used by way of example, locations 102 may be any type of user premises, such as businesses, institutions, etc. The links 101 may include components not illustrated, such as splitters, filters, amplifiers, etc. to help convey the signal clearly. Portions of the links 101 may also be implemented with fiber-optic cable, while other portions may be implemented with coaxial cable, other links, or wireless communication paths.

The local office 103 may include an interface 104, which may be a termination system (TS), such as a cable modem termination system (CMTS), which may be a computing device configured to manage communications between devices on the network of links 101 and backend devices such as servers 105-107 (to be discussed further below). The interface 104 may be as specified in a standard, such as, in an example of an HFC-type network, the Data Over Cable Service Interface Specification (DOCSIS) standard, published by Cable Television Laboratories, Inc. (a.k.a. Cable-Labs), or it may be a similar or modified device instead. The interface 104 may be configured to place data on one or more downstream channels or frequencies to be received by devices, such as modems at the various locations 102, and to receive upstream communications from those modems on one or more upstream frequencies. The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the network 109, and to other devices on the network such as a cellular telephone network and its corresponding cell phones (e.g., cell phone 117).

As noted above, the local office 103 may include a variety of servers 105-107 that may be configured to perform various functions. For example, the local office 103 may include a push notification server 105. The push notification server 105 may generate push notifications to deliver data and/or commands to the various locations 102 in the network (or more specifically, to the devices in the locations 102 that are configured to detect such notifications). The local office 103 may also include a data server 106. The data server 106 may be one or more computing devices that are configured to provide data to users in the homes. This data may be, for example, video on demand movies, television programs, songs, text listings, etc. The data server 106 may include software to validate user identities and entitlements, locate and retrieve requested data, encrypt the data, and initiate delivery (e.g., streaming) of the data to the requesting user and/or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting data such as television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the locations 102.

An example location 102a may include an interface 120. The interface may comprise a device 110, such as a modem, which may include transmitters and receivers used to communicate on the links 101 and with the local office 103. The device 110 may be, for example, a coaxial cable modem (for coaxial cable links 101), a fiber interface node (for fiber optic links 101), or any other desired modem device. The device 110 may be connected to, or be a part of, a gateway 111 (e.g., a gateway interface device). The gateway 111 may be a computing device that communicates with the device 110 to allow one or more other devices in the home to communicate with the local office 103 and other devices beyond the local office. The gateway 111 may be a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
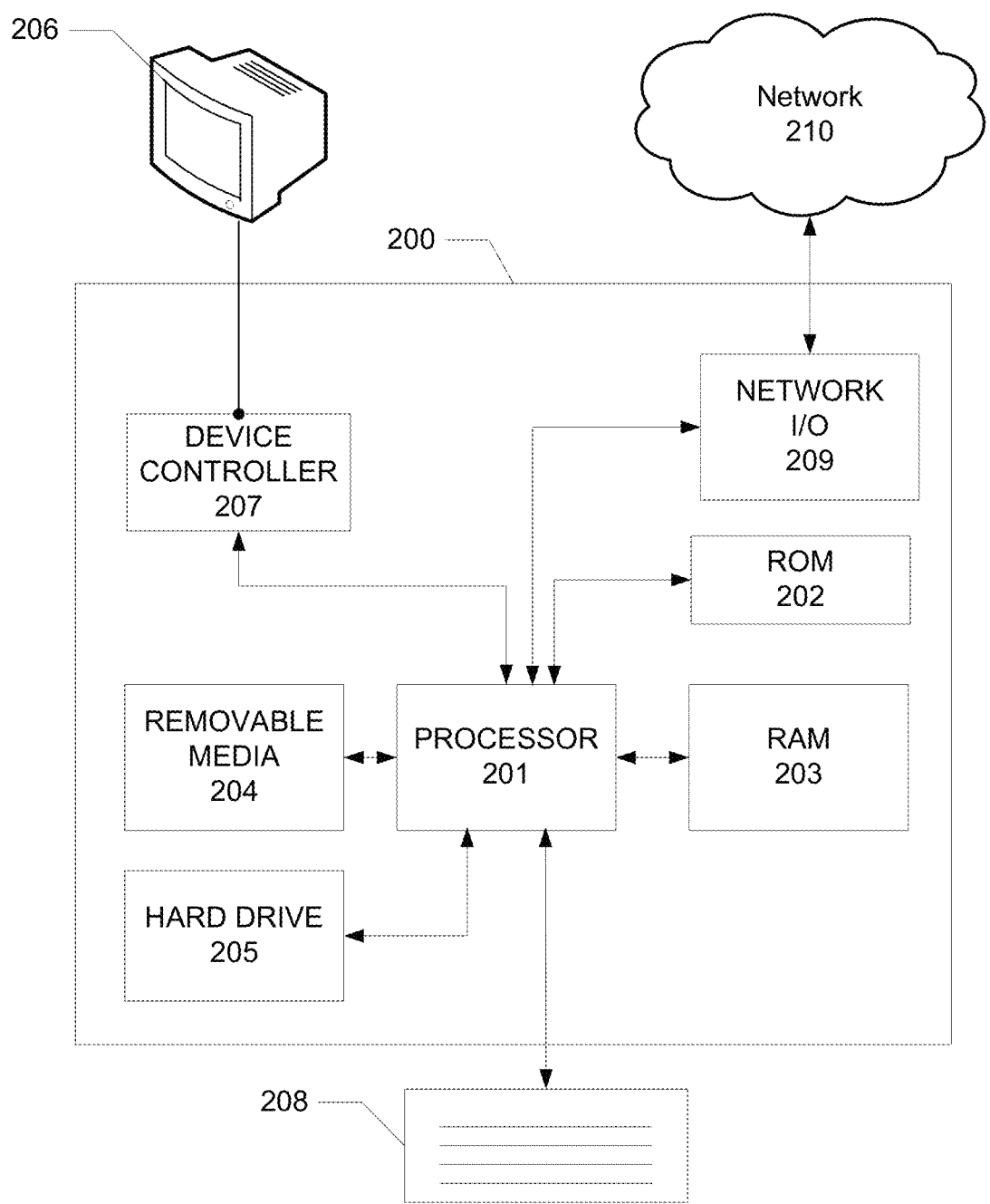
FIG. 2 illustrates an example hardware and software platform on which various elements described herein can be implemented.

FIG. 2 illustrates general hardware and software elements that can be used to implement any of the various computing devices (e.g., terminal devices, remote control devices, etc.) discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, hard drive, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc.

The computing device 200 may also include one or more network interfaces 209, such as input/output circuits (such as a network card) to communicate with an external network 210. The interface 209 may be a wired interface, wireless interface, or a combination of the two. In some embodiments, the interface 209 may include a modem (e.g., a cable modem), and the network 210 may include the communication links 101 discussed above, the external network 109, an in-home network, a provider's wireless, coaxial, fiber, or hybrid fiber/coaxial distribution system (e.g., a DOCSIS network), or any other desired network. The computing device 200 may communicate with the external networks 210 or other devices using one or more communication protocols, such as wired communication protocols and wireless communication protocols (e.g., Wi-Fi, Bluetooth, ZigBee, Z-Wave, etc.).

Described herein is a method for determining one or more data modulation profiles for groups of devices. Aspects described herein are used to determine a modulation profile, such as an orthogonal frequency-division multiplexing (OFDM) modulation profile for a given device population via an algorithm. In some aspects, the modulation profiles may comprise Data Over Cable Service Interface Specification (DOCSIS) OFDM modulation profiles, and the device population may comprise a cable modem (CM) population. The system and method described herein may evaluate each device OFDM frequency subcarrier error ratio, such as an MER and/or SNR, to calculate specific modulations (e.g., QAM modulations) for each subcarrier for a grouping of devices. Exemplary modulation orders for QAM include, but are not limited to, Binary Phase-shift keying (BPSK), Quadrature Phase Shift Keying (QPSK), 16 QAM, 64 QAM, 256 QAM, 512 QAM, 1024 QAM, 2048 QAM, 4096 QAM, 8192 QAM, 16384 QAM, etc.

The computing system described herein may determine the best probability for the subcarriers based on a number of subcarriers (N), and also based on one or more grouping of carriers for a given device (e.g., modem) population. That is, the system may group devices together that have similar response characteristics in order to assign the devices a particular profile to maximize their throughput. The devices that fit within a particular fitting (e.g., one standard deviation from a mean) may be grouped together and assigned a profile and a group of channels.

Modems may be evaluated in a given downstream of a termination system (e.g., CMTS) via Proactive Network Management (PNM) and/or Profile Management Application (PMA), and the system may determine the best OFDM profile or profiles. In some aspects, there may be a direct correlation and causation of MER versus QAM modulation profile. By determining the worst, average, best MER per subcarrier, the system may create dynamic profiles for a given modem population. In a given modem population, the system may assign multiple profiles. The methods described herein may create the profiles dynamically so that the PMA may assign the modem to a profile with the best data performance for that modem.

Figure 3:
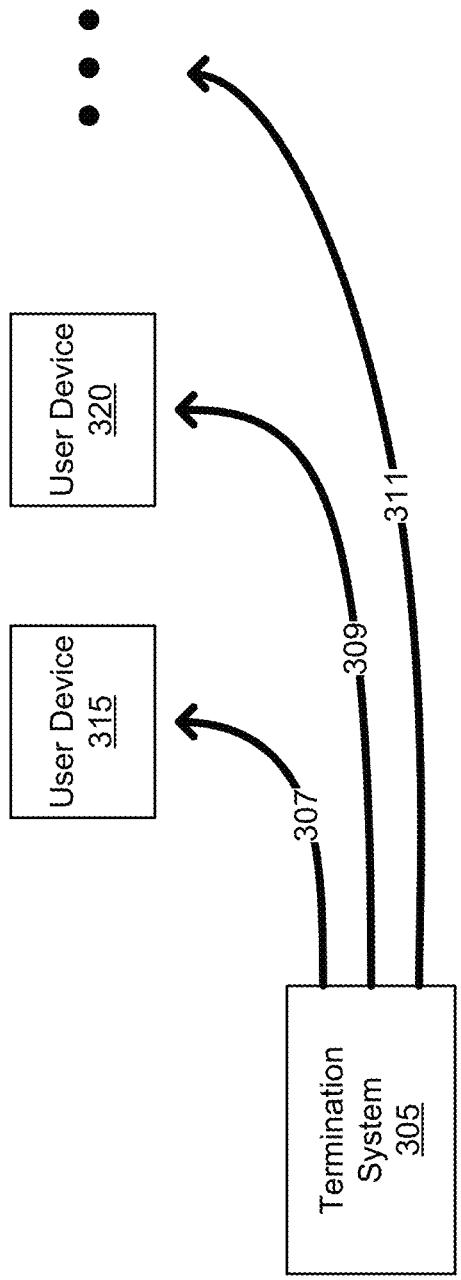
FIG. 3 illustrates an example of a termination system providing multiple modulation profiles to user devices according to one or more illustrative aspects of the disclosure.

FIG. 3 illustrates an example of a termination system 305 providing multiple modulation profiles to user devices 315 and 320 according to one or more illustrative aspects of the disclosure. For example, the termination system 305 may provide a first modulation profile 307 to the user device 315 and a second modulation profile 309 to the user device 320. The first modulation profile 307 and the second modulation profile 309 may comprise the same modulation profile or different modulation profiles. In other words, the termination system 305 may send the same modulation profile to two (or more) user device, or different modulation profiles to different user devices. The termination system 305 may similarly provide modulation profiles, such as the modulation profile 311, to other user devices (not illustrated).

Figure 4:
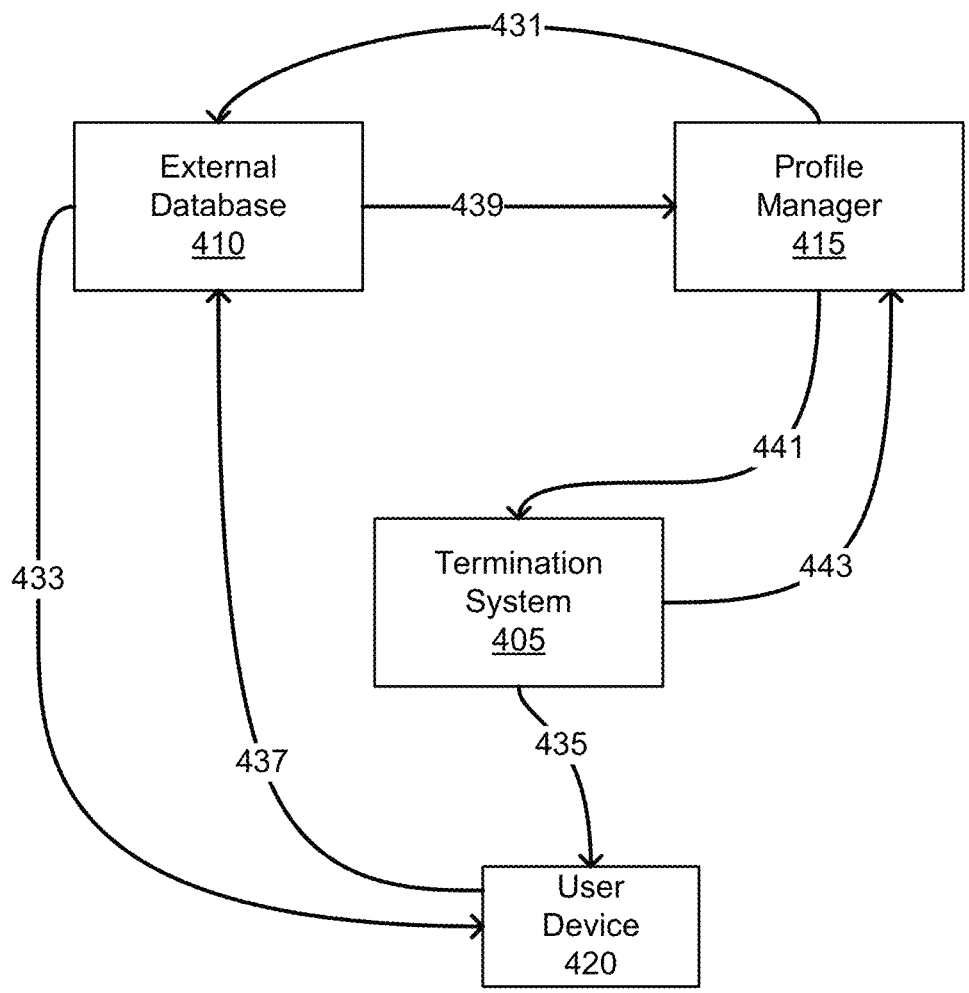
FIG. 4 illustrates an example network of devices used to provide one or more modulation profiles to user devices according to one or more illustrative aspects of the disclosure.

FIG. 4 illustrates an example network of devices 400 used to provide one or more modulation profiles to user devices according to one or more illustrative aspects of the disclosure. The network 400 may comprise a termination system (TS) 405, such as a cable modem termination system (CMTS). The network 400 may also comprise an external database 410 configured to receive various parameters from the termination system 405. The database 410 may comprise an external database (e.g., external to the termination system 405) or an internal database (e.g., internal to the termination system 405). The database 410 may comprise, for example, a Simple Network Management Protocol (SNMP) manager.

The network 400 may comprise a profile manager 415 configured to query the database 410 and to process the information by applying, for example, technical and/or business rules to determine one or more modulation profiles, such as optimal modulation profiles, to be used by each user device 420. The profile manager 415 may instruct the termination system 405 on how to implement the various profiles for each user device or for each service group. In addition, the profile manager 415 may query the database 410 and process the information to determine which user device within each service group will be assigned to each modulation profile.

In some aspects, the external database 410 and the profile manager 415 may be in the same system or computing device (e.g., server). The external database 410 and the profile manager 415 may be external to the termination system 405. Alternatively, the external database 410 and the profile manager 415 may be part of the termination system 405.

In step 431, the profile manager 415 may instruct (e.g., send a command on-demand, periodically (e.g., three times per day, every hour, every ten minutes, etc.), or occasionally) the external database 410 to initiate a measurement of signal quality at one or more user device 420. Signal quality may be measured by the modulation error ratio (MER), a signal to noise ratio (SNR), coding analysis, bit error ratio (e.g., for optical fiber communications), and the like. The measurements may comprise downstream or upstream measurements on one or more user device 420. Moreover, the measurements may be performed for one or more, such as all, modulation carrier signals, including orthogonal frequency-division multiplexing (OFDM) subcarriers. Measurements on the carriers or subcarriers may be used to identify, for example, noise and interference on a communication line or at the device. As will be described below, the carriers and subcarriers may be optimized based on the signal quality measurements.

In step 433, the external database 410 may initiate a test on each user device 420, such as the CmDsOfdmRxMer test specified in the Data Over Cable Service Interface Specification (DOCSIS) 3.1 standard. The CmDsOfdmRxMer test may instruct the user device 420 to perform a MER test on a received downstream OFDM signal. The external database 410 may initiate the test via, for example, Simple Network Management Protocol (SNMP) sets or any other network management protocol.

In step 435, the user device 420 may measure its signal quality, such as its downstream MER on each subcarrier. The user device 420 may perform this step by examining scattered pilots and/or PHY Link Channel (PLC) preamble symbols.

In step 437, the user device 420 may report the measurement results to the external database 410 via, for example, a file upload, such as a Trivial File Transfer Protocol (TFTP) file upload. The user device 420 may generate a results file with its test results and send the file to the external database 410, such as via TFTP.

In step 439, the external database 410 may provide test results or instructions to the profile manager 415 via a network communication protocol. The profile manager 415 may analyze the data to identify wireless signal ingress, whether the MER is within a certain range, whether the modulation for a particular user device 420 is to be changed based on the test results, and the like. In some aspects, the user device 420 may analyze its own test results and send the digested data to the external database 410 and/or the profile manager 415 (e.g., instead of or in addition to the profile manager 415 analyzing raw data from the user device 420).

In step 441, the profile manager 415 may determine (e.g., create) a new modulation profile, such as a downstream profile or an upstream profile, and assign one or more user device candidates to the new profile on the termination system 405. For example, the profile manager 415 may increase or decrease the order of modulation (which may be in bits per second per hertz). Exemplary modulation orders for QAM include, but are not limited to, Quadrature Phase Shift Keying (QPSK), 16 QAM, 64 QAM, 256 QAM, 512 QAM, 1024 QAM, 2048 QAM, 4096 QAM, 8K QAM, 16K QAM, etc. The profile manager 415 may update a user device's modulation profile in response to, for example, the signal quality (e.g., MER or SNR) falling below a threshold quality.

The assignment may be via a control interface, such as an internet protocol control interface (e.g., common open policy service (COPS) or any other internet protocol). The control interface may comprise a web services interface, such as a Representational State Transfer (REST) interface, including a RESTful interface. The modulation profile may specify an adjustment to the physical layer used by a cable modem to communicate with other devices, such as the terminal system 405. The modulation order for each subcarrier, modulation scheme, coding scheme, data speed, or any other factors may be adjusted for the cable modem. Some zones may be blocked altogether in profile definitions. User devices may be placed in different service groups based on the new modulation profile selected by the profile manager 415.

The termination system 405 may initiate a test of the new profile on each user device candidate, such as via a standard DOCSIS-defined mechanism. The termination system 405 may move the user device to a new modulation profile if the test for that user device was successful.

In step 443, the termination system 405 may acknowledge the new profile creation and user device profile assignment changes to the profile manager 415, via a protocol such as COPS or REST.

The system and method for updating modulation profiles may be used to manage wireless ingress, such as LTE wireless ingress. Major wireless voice/data carriers may provide LTE service using various frequency bands in the over-the-air RF spectrum. One LTE band commonly used in the U.S. (that may have a significant impact on cable systems) is referred to as the 700 MHz band (e.g., 698-806 MHz). If a coaxial cable in the cable operator's outside plant has damage to the cable's shielding, there may be a potential for over-the-air signals in the 700 MHz band to enter the cable and directly interfere with cable system DOCSIS channels operating at this frequency. This type of interference may be referred to as ingress.

The impact of ingress on the DOCSIS signals can be measured via a reduction in the Modulation Error Ratio (MER) of the DOCSIS channels. The data carrying capacity of a DOCSIS 3.1 channel may be directly affected by the MER value. With a higher MER value, a more complex signal modulation scheme can be used to carry more data in a given amount of spectrum. Conversely, with a lower MER value, a less complex signal modulation scheme may be used, which might carry less data in a given amount of spectrum.

Moreover, 700 MHz LTE ingress might not occur in all DOCSIS segments (e.g., all areas of the outside plant). Accordingly, the system and method described herein may be used to protect the DOCSIS network from LTE ingress only where the LTE ingress occurs (and not where it does not occur). This is because implementing an LTE ingress protection scheme may have the side-effect of lessoning the data carrying capability of the DOCSIS channel in that spectral region.

The modulation profile management system described herein may measure the MER on one or more (e.g., all) sub-carriers that make up the DOCSIS 3.1 channels on each network segment. The system may be programmed with specific algorithms to inspect the MER measurements and identify network segments where ingress is occurring. For example, the system may look for abnormally reduced MER measurements in the 700 MHz band. If the system identifies network segments showing low MER values in this band, the system may reconfigure the network to prevent data loss at the physical layer of the DOCSIS network, which might otherwise occur.

For example, if most of the DOCSIS 3.1 channel subcarriers are normally configured to make use of 4096 QAM modulation, the system may examine the MER values in the 700 MHz band and determine what QAM modulation order is a best fit for the network conditions in this band. The system may reduce the modulation order on the affected subcarriers to a value that is more likely to successfully get data through the impacted band (e.g., 1024 QAM or 256 QAM, instead of 4096 QAM).

While this reduction in modulation order on the subcarriers in this band may slightly reduce the efficiency of a given DOCSIS 3.1 channel, this slight reduction may be preferred to the alternative—inducing code word errors on the channel and potentially causing a loss of user data on the network. Moreover, while this reduction in modulation order in this band may slightly reduce the efficiency of the specific DOCSIS network segment, other network segments (e.g., segments without signs of LTE ingress) may be left configured to use the more efficient 4096 QAM on the subcarriers of the 700 MHz band, thus maximizing their efficiency.

Provisioning may be based on geographical location. For example, modulation in one neighborhood may be set to 4096 QAM (e.g., with little measurable ingress), and modulation in another neighborhood may be set to 1024 QAM. As another example, locations closer to the termination system 405 may be assigned to higher-order modulation, whereas locations farther from the termination system 405 (yet still served by the termination system 405) may be assigned to lower-order modulation.

Figure 5:
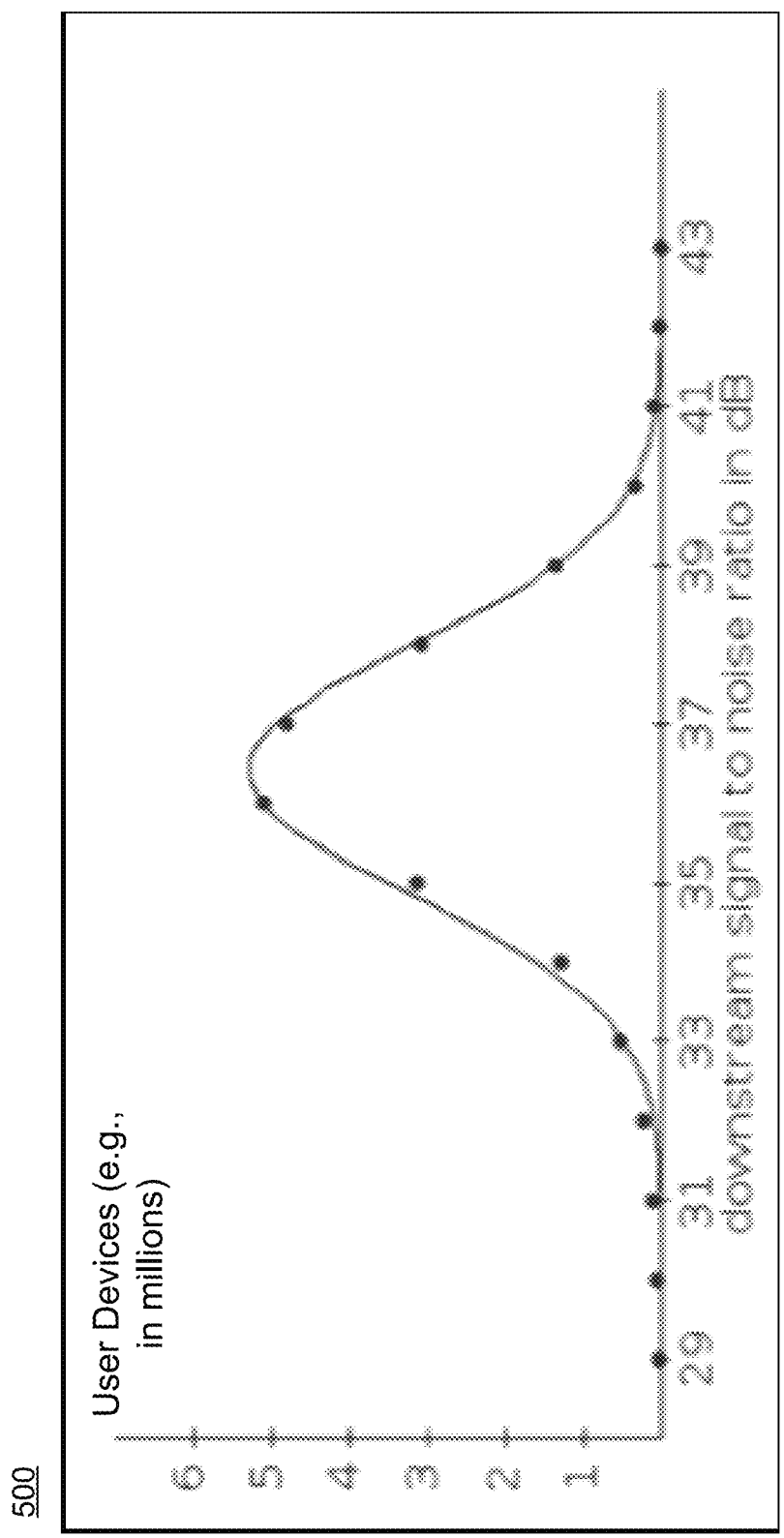
FIG. 5 illustrates an example distribution of signal to noise ratio at user devices that may be used to determine one or more modulation profiles for each user device according to one or more illustrative aspects of the disclosure.

The system and method for updating modulation profiles may be used to optimize channel capacity based on hybrid fiber-coaxial (HFC) plant variation. Within a network segment (e.g., service group), cable modems may have varying levels of receiver MER with a distribution that closely matches a distribution, such as a Gaussian distribution. FIG. 5 illustrates an example distribution 500 signal to noise ratio at user devices that may be used to determine one or more modulation profiles for each user device according to one or more illustrative aspects of the disclosure.

This phenomenon may be used to maximize channel capacity by instructing the modulation profile manager 415 to assign each modem into the highest modulation order profile based on its MER. For example, assume in the example below that 4 uniform bit-loaded profiles are created by the operator: A, B, C and D with modulation order of 256 QAM, 1024 QAM, 2048 QAM and 4096 QAM, respectively.

The modulation profile manager 415 may perform channel optimization by periodically initiating the MER measurement in each service group as noted in step 431 described with reference to FIG. 4. Once the measurements process is completed and the results available to the modulation profile manager (e.g., steps 433-439), each modem's MER may be compared against the thresholds for each profile, and the modem may be assigned to the highest order profile that matches. For example, and with reference to FIG. 5, if cable modem 1 had a MER of 40 dB (e.g., a higher SNR or MER), the highest modulation order that it might be placed into may be 2048 QAM or 4096 QAM. The manager 415 may assign it into Profile C or Profile D. If cable modem 2 in the same service group had a MER of 36 dB (e.g., a medium-level SNR or MER), it may be assigned to Profile B because at most 1024 QAM is the highest QAM order cable modem 2 might be able to support. If cable modem 3 had a MER of 33 dB (e.g., a low-level SNR or MER), it may be assigned to Profile A (e.g., 256 QAM). This process of assigning each modem into the highest profile may be done for some or all modems, thereby maximizing the channel capacity.

The process may periodically or occasionally repeat (e.g., forever) as the MER values slowly vary as a function of changing environmental conditions, aging effects of components in the HFC plant, local activity of in-home appliances, etc. The modulation profile manager 415 may assign to cable modems either a higher or lower capacity profile based on the MER change.

Figure 6:
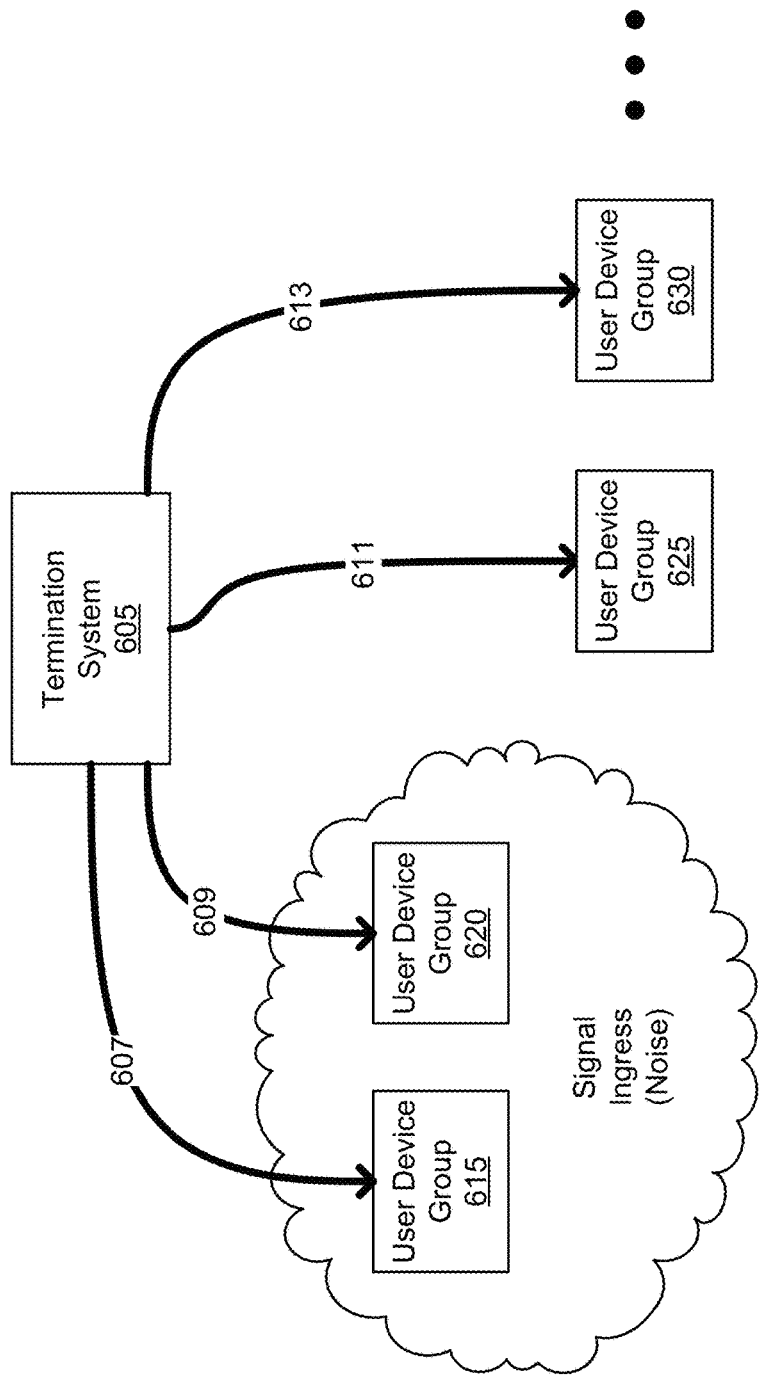
FIG. 6 illustrates an example of a termination system providing multiple modulation profiles to devices according to one or more illustrative aspects of the disclosure.

FIG. 6 illustrates an example of a termination system providing multiple modulation profiles to devices according to one or more illustrative aspects of the disclosure. For example, the termination system 605 may provide a first modulation profile 607 to the user device group 615 and a second modulation profile 609 to the user device group 620. The first modulation profile 607 and the second modulation profile 609 may comprise the same modulation profile or different modulation profiles. In other words, the termination system 605 may send the same modulation profile to two (or more) user device groups, or different modulation profiles to different user device groups. The termination system 605 may similarly provide modulation profiles to other device groups, such as the modulation profile 611 to the user device group 625, the modulation profile 613 to the user device group 630, and other modulation profiles to other user device groups (not illustrated).

In some aspects, the termination system 605 may provide more robust modulation profiles (e.g., lower order modulation profiles) to user device groups experiencing signal ingress or other noise, such as user device group 615 and user device group 620. Signal ingress may comprise, for example, noise caused by cellular communications, such as long-term evolution (LTE) signals, 5th generation mobile network (5G) signals, global system for mobile communications (GSM) signals, and the like. Ingress signals may comprise impulse signals, non-impulse signals, long duration signals (e.g., hours of static carriers), or any other noise signal that affects the upstream and/or downstream signal quality between a user device and the termination system.

Figure 7:
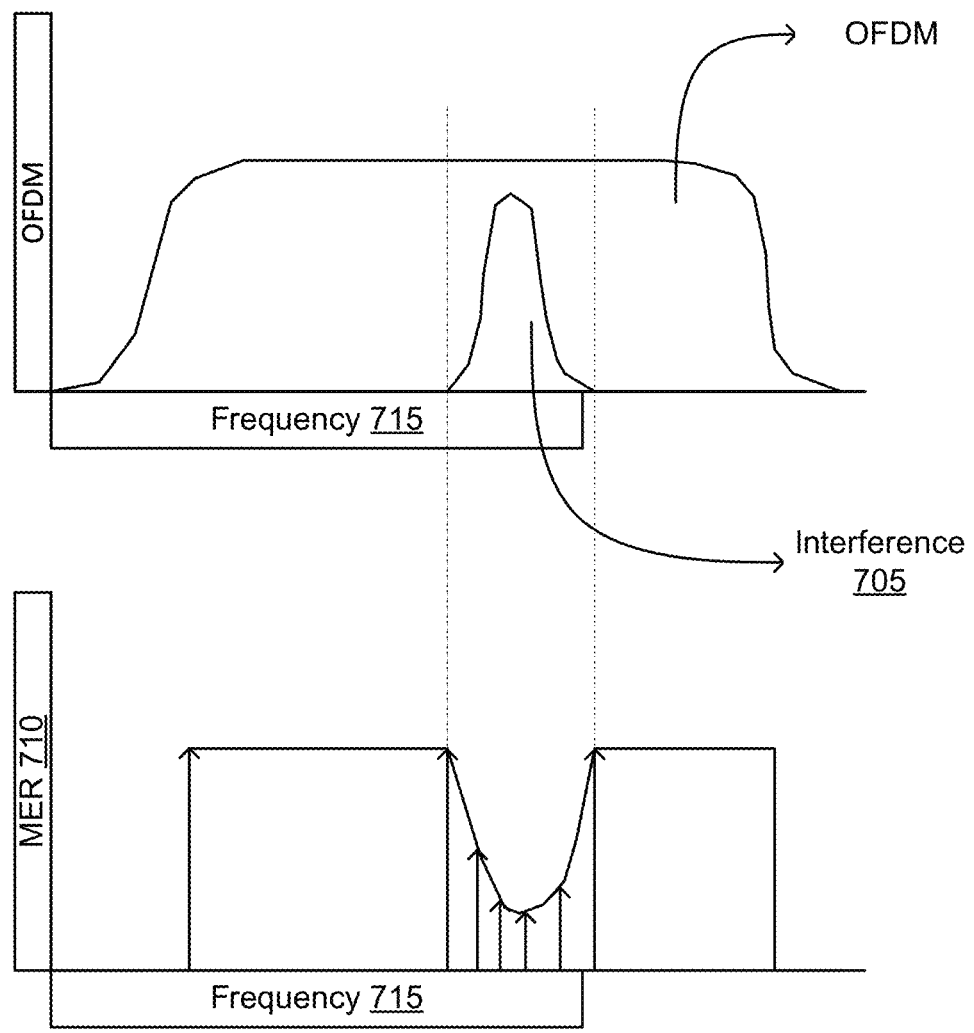
FIG. 7 illustrates an example of signal ingress and its effect on error ratio according to one or more illustrative aspects of the disclosure.

FIG. 7 illustrates an example of signal ingress and its effect on error ratio according to one or more illustrative aspects of the disclosure. The interference 705 (e.g., signal ingress, such as LTE signal ingress) may lower the MER 710 for one or more frequencies or frequency bands 715. As will be described in further detail below, the system may lower the modulation order for devices using certain subcarriers affected by signal ingress. User devices may measure their downstream and/or upstream signal qualities (e.g., MERs) and send the measurements to the termination system or other back end device.

Figure 8:
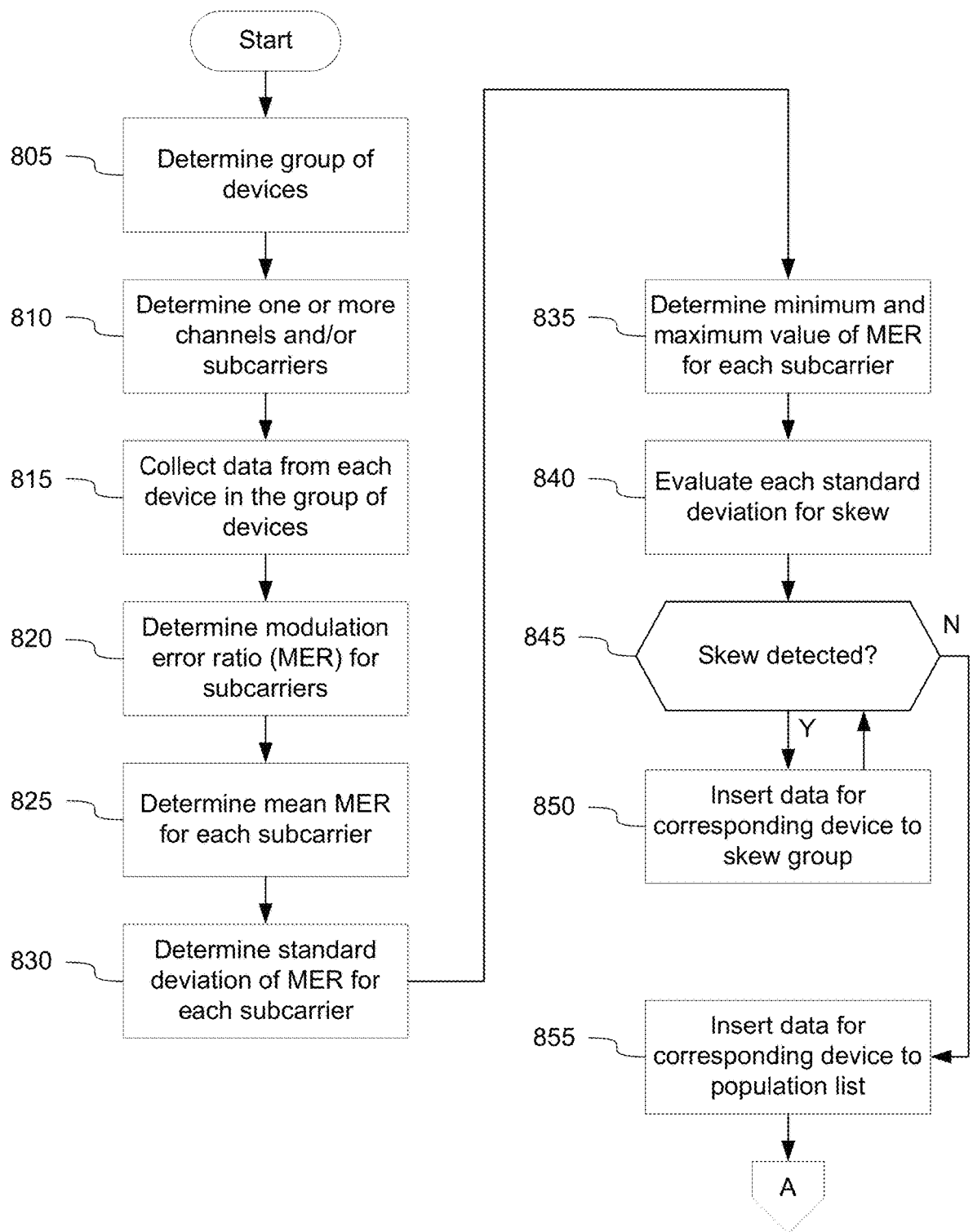
FIG. 8 illustrates at least a portion of a method for determining one or more data modulation profiles for groups of devices according to one or more illustrative aspects of the disclosure.

FIG. 8 illustrates at least a portion of a method for determining one or more data modulation profiles for groups of devices according to one or more illustrative aspects of the disclosure. The system may evaluate each device of a certain downstream group. The system may perform a standard deviation function for each subcarrier error rate (e.g., MER). For example, the system may determine a standard deviation for a subcarrier across each device in a group of n devices. The function may comprise Stdev (device-1-SC-1, device-2-SC-1 . . . device-n-SC-1). The system may determine the average MER and/or the spread of the MER. The standard deviation may be found for each of the subcarriers, until each subcarrier is evaluated. From the data, the system may generate N profiles of different robustness depending on, for example, the MER data and the standard deviation calculations. Additional details for determining one or more data modulation profiles for groups of devices will be described in further detail below.

With reference to FIG. 8, in step 805, a computing device may determine a group of user devices to evaluate, such as a device (e.g., modem) population. The devices in a single group may be devices in a particular geographic area and/or devices in communication with the same node (e.g., a termination system, a base station, an access point, etc.).

In step 810, the computing device may determine one or more channels and/or subcarriers for the channels to evaluate. For example, the computing device may determine an OFDM channel for transmitting data to and/or receiving data from the devices in the group (e.g., from and/or to an upstream node). The computing device may similarly determine the subcarriers in the channel. The OFDM channel may have N number of subcarriers. As will be described below, each subcarrier may be evaluated against each device in the device (e.g., modem) population.

In step 815, the computing device may collect data from each device in the selected group of devices. In some aspects, the collected data may comprise MER (e.g., the receive modulation error ratio (RxMER)), SNR, or any other data indicative of error rate. MER may be used as a proxy for the SNR. The collected data may also comprise, for example, forward error correction (FEC) data. Devices may encode messages in a redundant way using a code (e.g., error-correcting code), which can be compared to the body of the message to detect errors. The data collected by the computing device may comprise PNM data. The computing device might collect data, for example, 8 or 9 symbol times (or any other number of times) if the data collected is over a short duration. That is, the computing device may collect multiple captures over time. This could be any number, such as N+1. A faster sample time may be used in order to detect burst noise, which may, in some examples, be shorter than 8 symbols in length.

The computing device may collect enough data to generate an MER for each point. Measurement data may be collected from each device in a downstream serving group. In some aspects, the collected data may comprise one or more signals coming via an S connector of the CMTS, and each S connector may be going out to a particular area in the modem population world.

Figure 9:
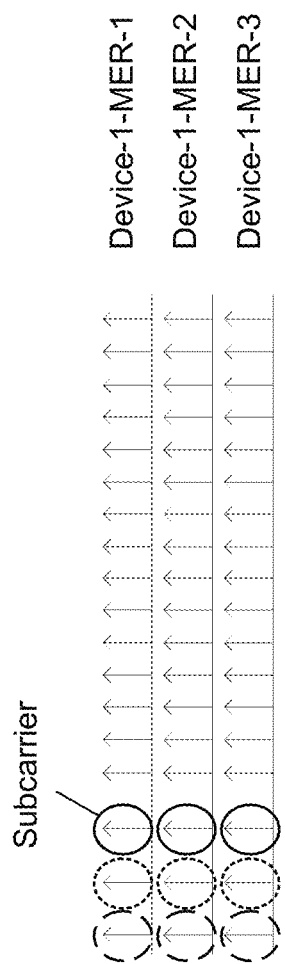
FIG. 9 illustrates examples of a plurality of subcarriers for one or more devices according to one or more illustrative aspects of the disclosure.

FIG. 9 illustrates examples of a plurality of subcarriers for one or more devices according to one or more illustrative aspects of the disclosure. The N+1 data collection described above may be received from a device, such as device 1. As illustrated in FIG. 9, the computing device may collect device 1, sample 1 data, device 1, sample 2, device 1, sample 3 data, and so forth. Each illustrated arrow may comprise a subcarrier.

Returning to FIG. 8, in step 820, the computing device may determine the MER for the subcarrier from the data collected in step 815. In step 825, the computing device may determine the mean (e.g., average) MER for each subcarrier, such as the average for each device subcarrier N+1 data. The computing device may calculate the average decibel (dB) value for each of the subcarriers. For example, if the first MER is 50, the second MER is 50, and the third MER is 50, the computing device may calculate the average MER as 50 dB. In other aspects, the mean MER may be closer to, for example, 41 dB. As will be described below, the computing device may normalize the average MER of a particular profile over a period of time.

In step 830, the computing device may determine the standard deviation of the MER for each subcarrier. As a brief example, the first deviation may be 0.5 dB or 1 dB from the mean of the MER. The function used for a first subcarrier (SC-1) may be represented as stdev(MER @ SC-1). The computing device may calculate a standard deviation for each user device's MER average. As will be described below, the spread (which may be measured by the standard deviation) may be used to determine how many modulation profiles to assign.

In step 835, the computing device may determine a minimum and/or a maximum value of the MER for each subcarrier. That is, the computing device may determine the lowest MER across a device population per subcarrier (e.g., floor(MER[ ])) and/or the highest (or best) MER across a device population per subcarrier (e.g., ceiling(MER[ ])).

Figure 10:
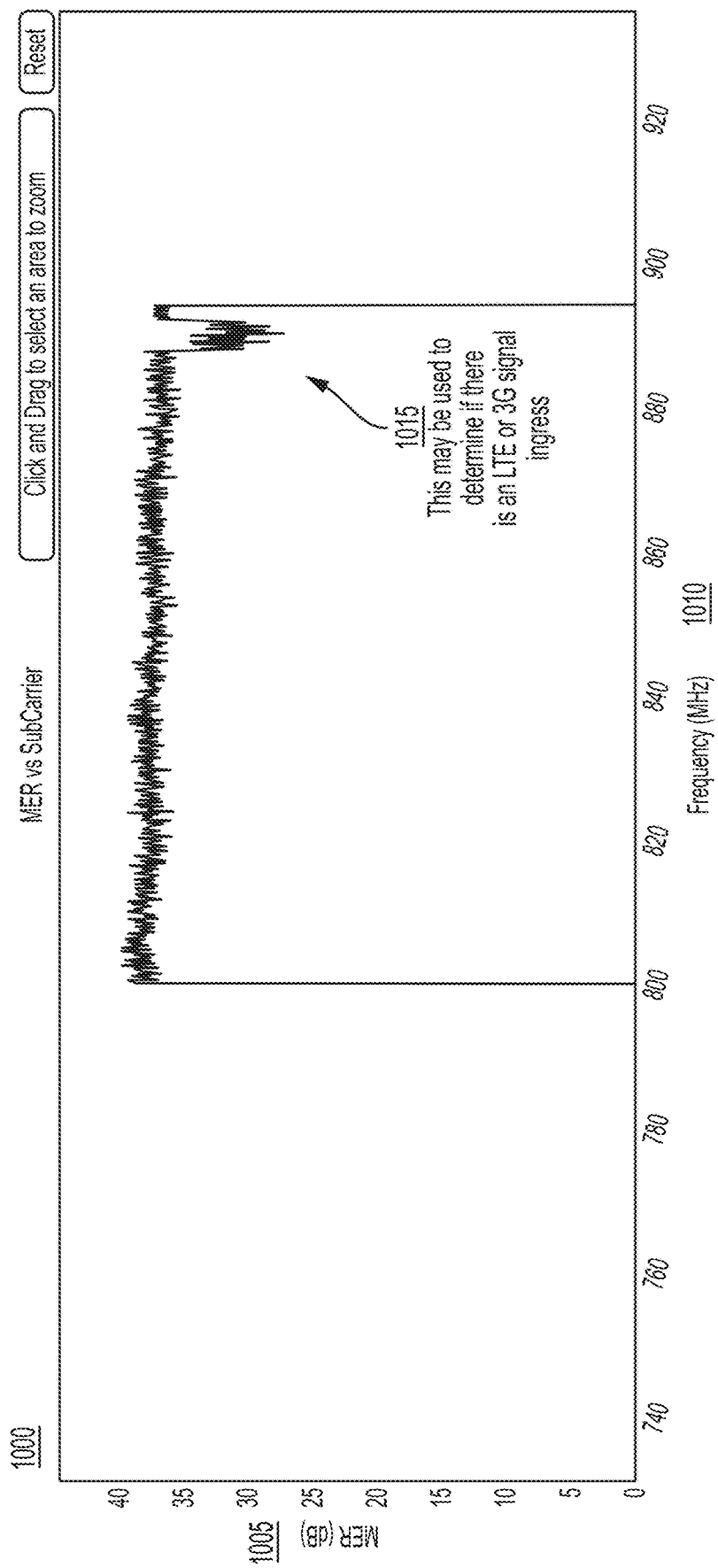
FIG. 10 illustrates an example of detecting skew for determining signal ingress according to one or more illustrative aspects of the disclosure.

In step 840, the computing device may evaluate each standard deviation for skew. FIG. 10 illustrates an example 1000 of detecting skew for determining signal ingress according to one or more illustrative aspects of the disclosure. A PNM (or other) application may plot the MER magnitude in dB 1005 versus subcarrier frequency 1010 in a graphical format. Variations in MER may be due to variation in the receive level, the ingress strength among the subcarriers, or a combination of both. In displaying the MER (e.g., RxMER), ingress or network impairments may be graphically viewed. As illustrated in FIG. 10, a search criterion may be used to search for devices with a standard deviation greater than one, with a skewness value less than a threshold (e.g., −1) to detect sharp ingress. The dip 1015 illustrated in the graph may be caused by LTE or 3G signal ingress in one or more carriers. It might be unknown how the signal ingress was introduced, but the standard deviation and skewness may be used as key performance indicators (KPIs). Using automation, devices, such as cable modems, can be quickly screened for a potential problem.

In some aspects, the computing device may determine whether the skewness satisfies (e.g., is greater than) a threshold (e.g., greater than minus 1). If so, the skewed data may be removed. If not (e.g., skewness between 0 and minus 1), the computing device may determine that the data is not skewed and keep the data for the device in the population group.

Figure 11:
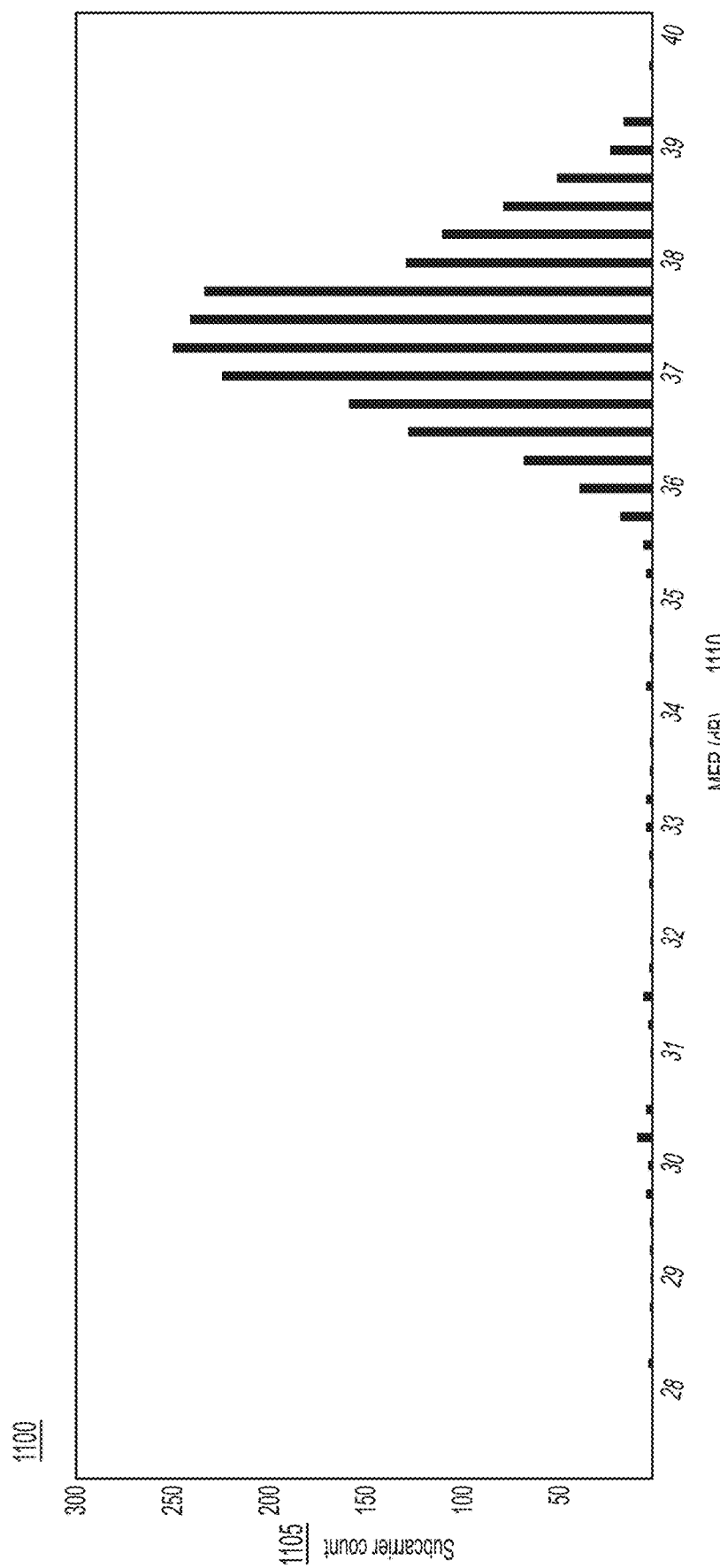
FIG. 11 illustrates another example of detecting skew for determining signal ingress according to one or more illustrative aspects of the disclosure.

FIG. 11 illustrates another example 1100 of detecting skew for determining signal ingress according to one or more illustrative aspects of the disclosure. In particular, FIG. 11 illustrates the distribution of the subcarrier count 1105 per MER 1110 (e.g., the number of subcarriers at each MER). Skewness is observed with a shift of the MER count to the right.

Returning to FIG. 8, in step 845, the computing device may determine whether skew was detected for any of the devices. If there are skews in the data, the skews may cause an issue with grouping devices. Skews in the data may indicate that the data does not properly distribute evenly. The skew may be caused by a signal ingress. The process for identifying skewness may be similar to a noise cancellation process. For example, instead of using a FFT or digital processing, the computing device may perform instant polarization and find the slope, e.g., equivalent to 3 dB cut off on each end. The computing device may determine where those frequencies are, and then create a cancellation. A moving average may be used to determine where a slope caused by signal ingress begins and ends, and the computing device may exclude data (e.g., frequencies) between those two slopes for the present population. Additionally or alternatively, a Gaussian distribution analysis of the points may be performed. If the computing device finds a skewness value of less than a threshold (e.g., less than minus 1), the computing device may determine that that is a key performance indicator and that there is a sharp ingress in the OFDM channel.

If skew was detected (step 845: Y), in step 850, the computing device may insert the data for the corresponding device in a different group, such as its own group or a group of devices having skewed data. For cable modems, the computing device may insert the CM RxMER PNM data into a CM skewness list/group. That is, if skewness caused by signal ingress is identified, the corresponding device may be excluded from the device population list, and the device may be addressed separately (or with other skewed devices). In other words, an exclusion area may be created to exclude certain subcarriers. Removing skewness may be performed in order to maintain an even distribution of data.

A separate modulation profile may be created for devices having skewed data (e.g., profile E). In some aspects, a termination system may support eight or more different profiles. One or more of those profiles may be assigned to devices without skewed data, and one or more profiles may be assigned to devices with skewed data. In some aspects, a device, such as a cable modem, may support up to four different profiles.

If skew was not detected (step 845: N), in step 855, the computing device may insert the data for the corresponding device into a population list. For cable modems, the computing device may insert CM RxMER PNM data into a CM SG Population List (SGPL). The list may comprise an indexable array of MER data that may be identified by cable modem IDs (e.g., addresses).

Figure 12:
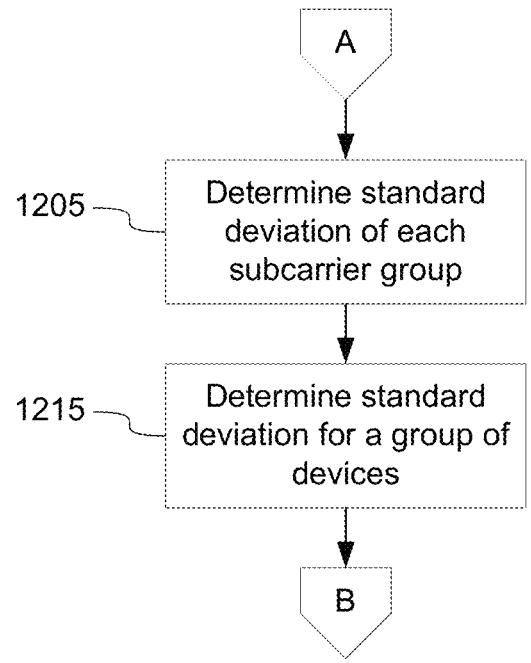
FIG. 12 illustrates at least a portion of a method for determining one or more data modulation profiles for groups of devices according to one or more illustrative aspects of the disclosure.

FIG. 12 illustrates at least a portion of a method for determining one or more data modulation profiles for groups of devices according to one or more illustrative aspects of the disclosure. As a result of one or more of the steps illustrated in FIG. 8, the system may have individual MER data for each point of a particular OFDM channel across, for example, N+1 devices. After collecting the individual MER data, the system may create a standard deviation of each subcarrier group.

In step 1205, the computing device may determine the standard deviation of each subcarrier group. For example, the computing device may evaluate each subcarrier in a group individually, and then apply a standard deviation algorithm. A group of subcarriers may be used in a particular channel, such as an OFDM channel.

Figure 13:
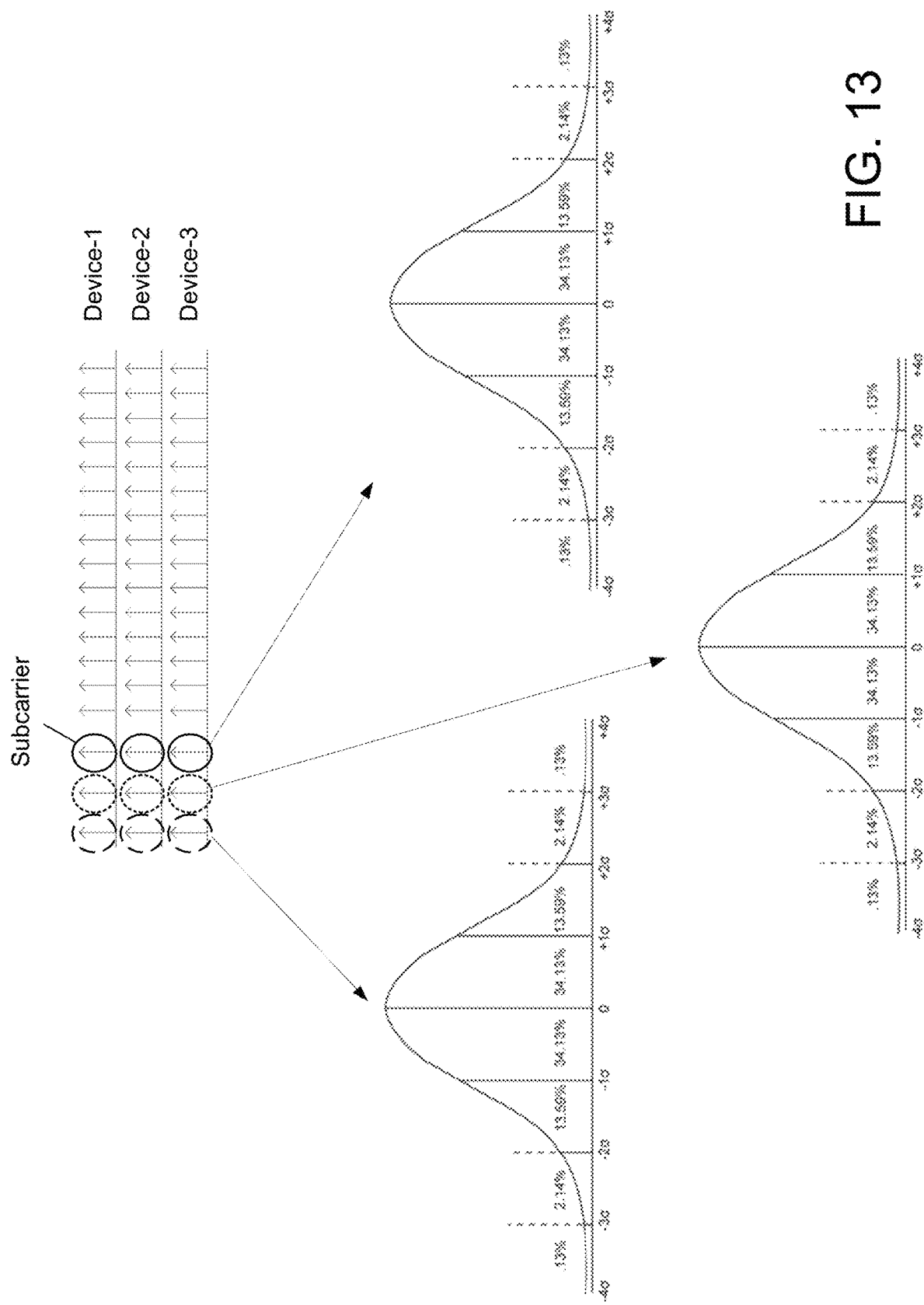
FIG. 13 illustrates an example of determining one or more standard deviations for one or more subcarriers according to one or more illustrative aspects of the disclosure.

FIG. 13 illustrates an example of determining one or more standard deviations for one or more subcarriers according to one or more illustrative aspects of the disclosure. FIG. 13 illustrates 18 subcarriers, but there may be any number of subcarriers, such as 1800 subcarriers, 4000 subcarriers, etc. The subcarriers may be part of the same channel, such as an OFDM channel. For the sake of brevity, FIG. 13 illustrates 3 devices (device 1, device 2, and device 3) being evaluated, but any number of devices in the network may be evaluated. The devices may be in the same group, such as a serving group.

For example, 3 devices at 3 different parts of the network may be using the same OFDM channel for communication. Each row of subcarriers may represent a single OFDM channel. The number of subcarriers may be represented by the number of arrows. The devices may be geographically close to each other or geographically far from each other. For example, device 1 could be 3 miles from device 2, and device 3 could be 10 miles from device 1. However, the devices may be in the same group of devices (e.g., a serving group) and may be fed from the same communication line(s) and/or networks (e.g., from the same cable for cable modems). As a brief example, the computing device may compute the mean and standard deviation for one of the subcarriers. Assume that the subcarrier MER for device 1 is 40, the subcarrier MER for device 2 is 42, and the subcarrier MER for device 3 is 39. Based on these three data points, the computing device may determine that the mean is 40.33 and the deviation is approximately 1. While this brief example relies on 3 data points, many more data points (e.g., hundreds, thousands, tens of thousands, etc.) are included in the calculation because groups of devices may comprise hundreds, thousands, or tens of thousands of devices. As described herein, the standard deviation for a group of devices may be used to determine whether to group the devices together for data distribution via one or more channels and/or subcarriers.

Returning to FIG. 12, in step 1215, the computing device may determine the standard deviation for a group of devices (e.g., a serving group) after the computing device determines the standard deviation of each subcarrier group (e.g., in step 1205).

Figure 14:
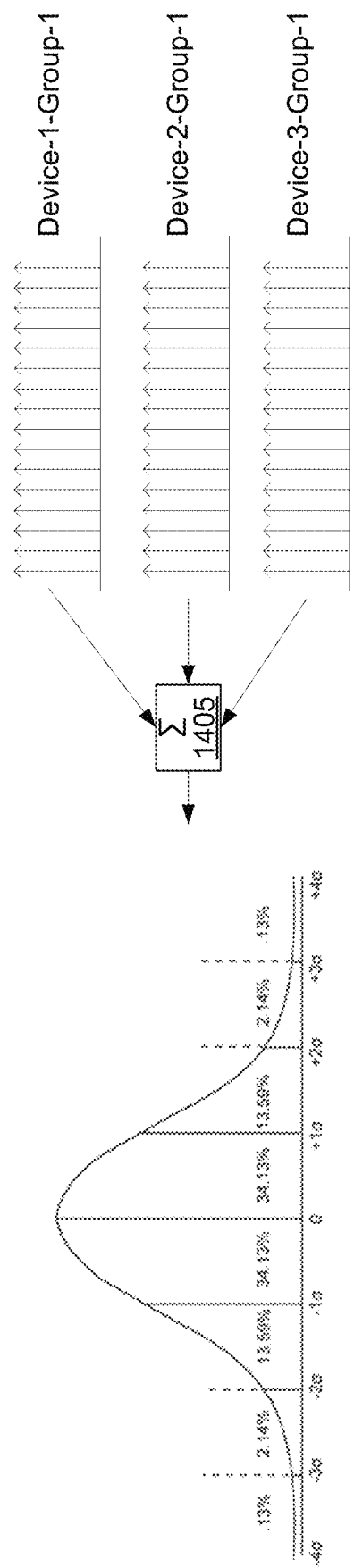
FIG. 14 illustrates an example of determining one or more standard deviations for one or more devices in a group according to one or more illustrative aspects of the disclosure.

FIG. 14 illustrates an example of determining one or more standard deviations for one or more devices in a group according to one or more illustrative aspects of the disclosure. Working from the right side to the left, each row may comprise a device in the group (e.g., a cable modem in a particular serving group). In some aspects, the computing device may take the data from a group that is not skewed. Again, FIG. 14 illustrates 3 devices in group 1, but group 1 may include hundreds, thousands, or tens of thousands of devices.

The computing device may take the summation 1405 of the points for one or more of the devices in the group (e.g., all of the devices). The computing device may perform a standard deviation function on the result of the summation of data points. In some aspects, because the skewed data was removed, a relatively evenly distributed population of information may result.

Figure 15:
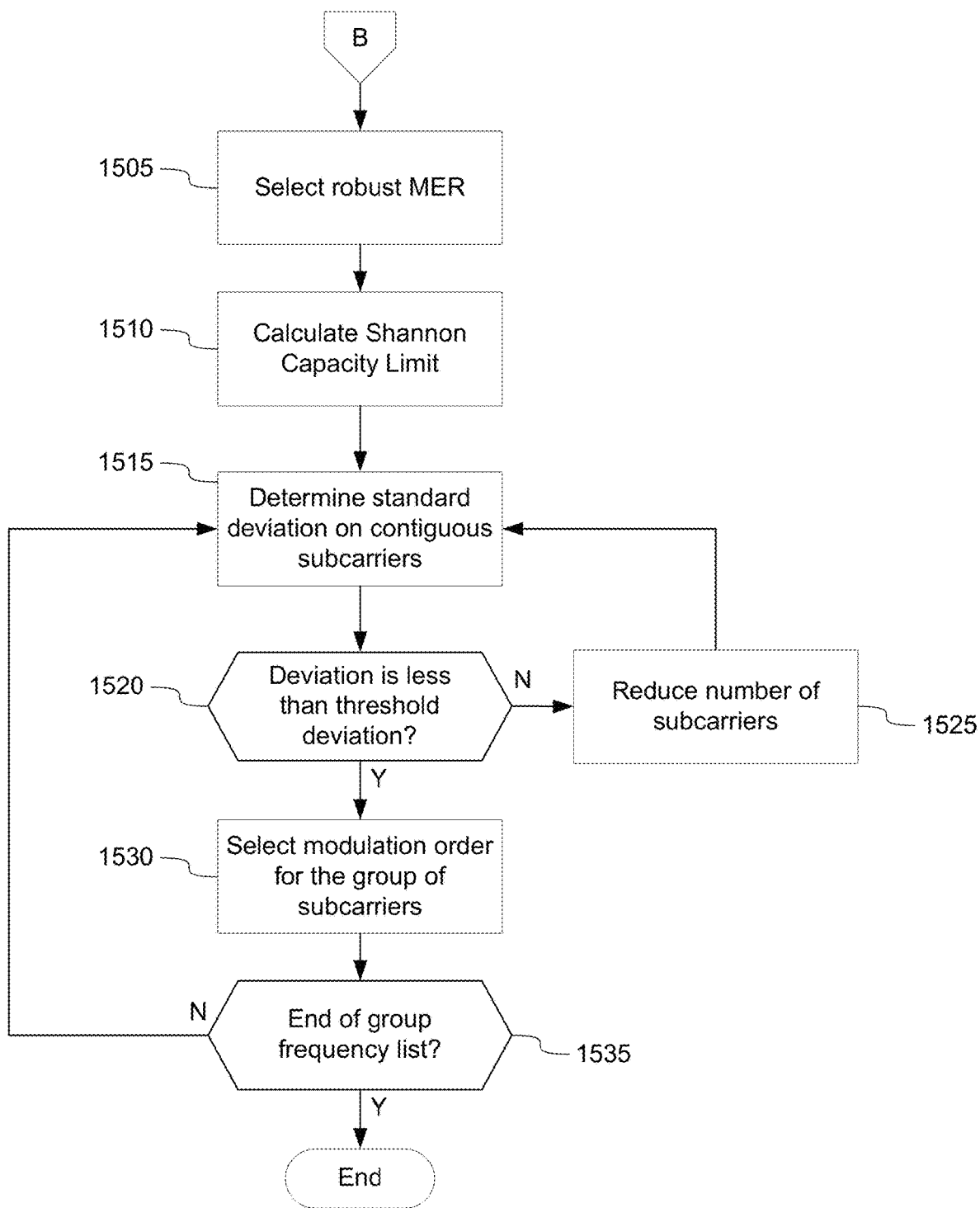
FIG. 15 illustrates at least a portion of a method for determining one or more data modulation profiles for groups of devices according to one or more illustrative aspects of the disclosure.

FIG. 15 illustrates at least a portion of a method for determining one or more data modulation profiles for groups of devices according to one or more illustrative aspects of the disclosure. One or more of the steps illustrated in FIG. 15 may be used to determine one or more modulation (e.g., OFDM) profiles for one or more devices. In some aspects, profiles for a device group may be selected based on the MER and spectrum analysis data, as described herein. Moreover, a particular modulation profile may be used on contiguous subcarriers. Contiguous subcarriers may, for example, use adjacent frequencies. In general, the system may assign the same modulation profile to a group of contiguous subcarriers, as will be described in detail below. Exemplary modulation profiles (or orders) for QAM include, but are not limited to, Binary Phase-shift keying (BPSK), Quadrature Phase Shift Keying (QPSK), 16 QAM, 64 QAM, 256 QAM, 512 QAM, 1024 QAM, 2048 QAM, 4096 QAM, 8192 QAM, 16384 QAM, etc.

In step 1505, the computing device may select a robust MER for a group of subcarriers (e.g., contiguous subcarriers). The robust MER (and its corresponding modulation order) may support the greatest number of devices, a threshold number of devices, and/or a certain ratio of the device population. For example, the computing device may select the MER at a certain number of standard deviations from the mean, such as −3 standard deviations from the mean, and/or may select the minimum MER measured for the device population (excluding skewed data). With brief reference to FIG. 16, profile A 1605 may correspond to the group of devices having MERs greater than or equal to the MER at −3 standard deviations from the mean. The selected robust MER at −3 standard deviations may be, for example, an MER value of 31.

Returning to FIG. 15, in step 1510, the computing device may calculate the Shannon Capacity limit, e.g., the theoretical maximum channel capacity (C) at a low error rate, for the selected error rate metric (e.g., MER, SNR, CNR, etc.). If SNR is used as the indicator for error rate, the computing device may compute $C=\log_2 (1+SNR)$. If carrier-to-noise ratio (CNR) is used as the indicator for error rate, the computing device may compute $C=\log_2 (1+CNR)$. The Shannon-Hartley theorem may be used for any signal to noise in the digital realm, e.g., MER. For example (and as will be described in further detail below), the power to amplitude may be used instead of the SNR or MER. The computing device may factor in one or more weights in the algorithm. The channel capacity (C) may be expressed as bits per symbol or bits per hertz. The channel capacity may indicate the coding bandwidth. In some aspects, the computing device may use a floor function on the result (e.g., C).

If MER is used as the indicator for error rate, the computing device may calculate the capacity $C=\log_2 (1+10^{MER/10})$. A brief example with an MER of 31 will be described. The channel capacity $C=\log_2 (1+10^{31/10})=\log_2 (1+1258.9)=\log_2 (1259.9)=10.29$ bits per symbol. The computing device may use the floor function on C (e.g., floor [10.29]), which results in 10 bits per symbol. In order to calculate the modulation order, the computing device may apply the following formula: Modulation Order$=2^{floor[C]}=2^{10}=1024$. Therefore, for an MER of 31, the computing device may select 1024 QAM as the modulation profile. 1024 QAM may support MERs of 31 and higher. Accordingly, carriers with higher MERs (e.g., 33 MER or 34 MER) can also be supported by 1024 QAM, and these carriers are also candidates for the 1024 QAM modulation profile (or potentially higher order modulation profiles). On the other hand, the computing device may assign subcarriers with MERs lower than 31 to lower-order modulation profiles, such as 256 QAM or 512 QAM.

Figure 16:
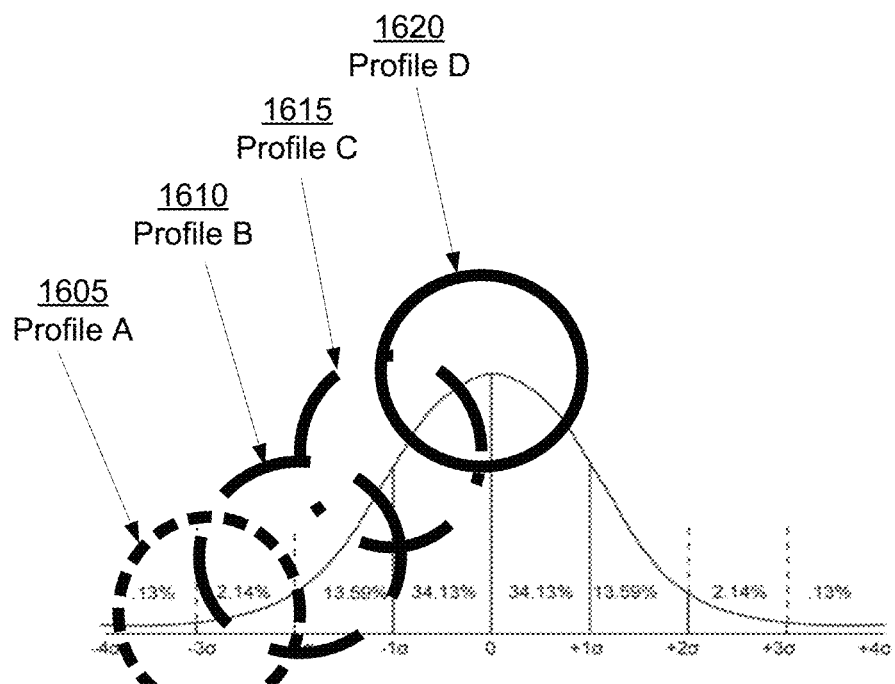
FIG. 16 illustrates an example of determining one or more data modulation profiles for one or more devices in a group according to one or more illustrative aspects of the disclosure.
Figure 16:
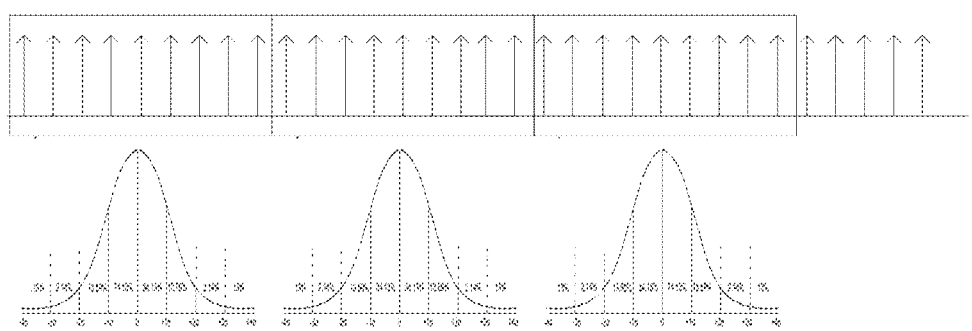

In step 1515, the computing device may determine (e.g., compute) a standard deviation on the selected group of contiguous subcarriers (e.g., N number of subcarriers). The contiguous subcarriers may be used over the same frequency band and/or frequency channel. The computing device may include any number of subcarriers in each group of contiguous subcarriers. With reference to FIG. 16, the computing device may include nine subcarriers in each frequency group (e.g., Group-Freq-1, Group-Freq-2, Group-Freq-N, etc.). Any number of subcarriers can be included in the groups, such as 50 subcarriers, 100 subcarriers, etc. Moreover, a frequency group may have the same number of subcarriers as another frequency group, or may have a different number of subcarriers as the different frequency group. For example (and for modulation profile A 1605), the computing device may target a −3 deviation. The computing device may take the −3 deviation of each subcarrier group.

Returning to FIG. 15, in step 1520, the computing device may determine whether the deviation calculated for the selected modulation profile (e.g., Profile A 1605) is less than a threshold deviation (e.g., 0.5). If the deviation is more than the threshold deviation, the system runs the risk of crossing into a different modulation order or profile. In other words, the computing device may attempt to keep the deviation as small as possible (e.g., less than 0.5). Accordingly, the MER may be kept tight. With reference to FIG. 16, a tight fit may graphically be indicated by the subcarrier arrows in a particular frequency group being approximately the same or similar magnitude. Returning to FIG. 15, if the deviation is less than the threshold deviation (step 1520: Y), the computing device may proceed to step 1530, which will be described in further detail below. If the deviation is not less than the threshold deviation (step 1520: N), the computing device may proceed to step 1525.

In step 1525, the computing device may reduce the number of subcarriers if the deviation is not less than the threshold deviation. The computing device may reduce the number of subcarriers by a predetermined amount, such as 25%. For example, if there are 100 subcarriers in the group, the computing device may remove 25 of the subcarriers. If the computing device can identify which subcarrier(s) are causing the standard deviation to be above the threshold deviation, the computing device may remove those subcarrier(s) directly. If the computing device does not identify specific subcarrier(s) to remove, the computing device may simply reduce the number of subcarriers to generate a new group of contiguous subcarriers. The computing device may return to step 1515 and determine the standard deviation on the new group of contiguous subcarriers. In step 1520, the computing device may determine whether the standard deviation for the new group of contiguous subcarriers is below a threshold deviation. The computing device may repeat this loop until the number of contiguous subcarriers is reduced to a point where the standard deviation for the group is less than a threshold deviation. Accordingly, the computing device may group as many subcarriers together with the same modulation order, while meeting one or more criterion (e.g., threshold standard deviation or other criterion).

In step 1530, the computing device may select a modulation profile for the group of subcarriers. Exemplary modulation profiles (or orders) for QAM include, but are not limited to, Binary Phase-shift keying (BPSK), Quadrature Phase Shift Keying (QPSK), 16 QAM, 64 QAM, 256 QAM, 512 QAM, 1024 QAM, 2048 QAM, 4096 QAM, 8192 QAM, 16384 QAM, etc. In some aspects, the modulation profile may be determined by accessing data associating standard deviations from the mean with a modulation profile (e.g., a table associating X standard deviation with profile A, associating Y standard deviation with profile B, associating Z standard deviation with profile C, and so forth). For example, −3 standard deviations may be assigned a modulation profile A 1605, as illustrated in FIG. 16, and user devices with a modulation profile A may use a modulation order of 1K QAM. The computing device may additionally or alternatively determine the appropriate modulation profile based on the Shannon Capacity limit, as previously described. In some aspects, the computing device may assign a modulation profile without a low density parity check code (LDPC).

In step 1535, the computing device may determine whether it has reached the end of the group frequency list. The computing device may assign modulation profiles for each group of subcarriers in a channel or block, such as in an OFDM block. If the computing device has not reached the end of the group frequency list (step 1535: N), the computing device may return to step 1515 to identify the additional group of subcarriers and determine its standard deviation(s).

FIG. 16 illustrates an example of determining one or more data modulation profiles for one or more devices in a group according to one or more illustrative aspects of the disclosure. The top standard deviation curve illustrated in FIG. 16 may result from the summation illustrated in FIG. 14 (and previously described). FIG. 16 illustrates an assignment of four different profiles (A, B, C, and D), but any number of profiles may be used. Devices in a group of devices (e.g., in a serving group) having MERs at −3 standard deviations from the mean MER for the group of devices may be assigned profile A 1605. Profile A 1605 may be a lower-order modulation profile, such as 256 QAM or 1K QAM. Devices in the group of devices having MERs at −2 standard deviations from the mean MER for the group of devices may be assigned profile B 1610. Profile B 1610 may be a low to mid-order modulation profile, such as 2048 QAM. Devices in the group of devices having MERs at −1 standard deviation from the mean MER for the group of devices may be assigned profile C 1615. Profile C 1615 may be a mid to high-order modulation profile, such as 4096 QAM. Devices in the group of devices having MERs at 0 standard deviations from the mean MER for the group of devices may be assigned profile D 1620. Profile D 1620 may be a high-order modulation profile, such as 8192 QAM. In some aspects, the remaining devices may be assigned to profile D 1620. In other aspects, the computing device may assign one or more higher-order modulation profiles to the remaining devices. Whether high-order modulation profiles are assigned may depend on which modulation orders and/or the number of modulation profiles supported by each device and/or the termination system. Moving from left to right (e.g., as the deviation increases), the number of supported devices (e.g., cable modems) may decrease. That is, at −3 standard deviations, nearly all of the devices would be supported by profile A. Fewer devices would be supported by profile B, and so on.

As described above, one or more of the steps illustrated in FIG. 15 may be repeated until each group of contiguous subcarriers is assigned to a modulation profile. As illustrated in FIG. 16, Group-Freq-1 subcarriers may be assigned to one modulation profile, Group-Freq-2 subcarriers may be assigned to another modulation profile, Group-Freq-N subcarriers may be assigned to yet another modulation profile, and so on.

Figure 17:
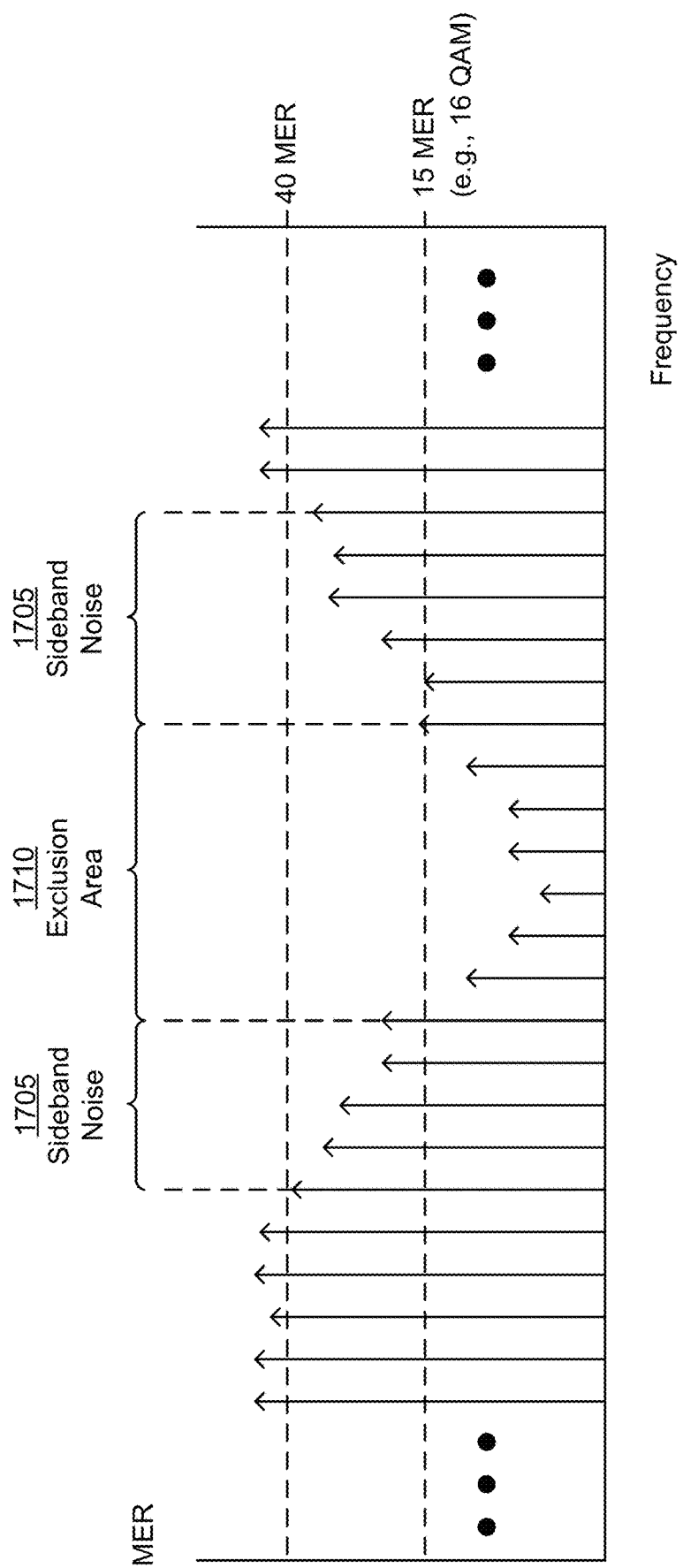
FIG. 17 illustrates another example of assigning modulation profiles according to one or more illustrative aspects of the disclosure.

FIG. 17 illustrates another example of assigning modulation profiles according to one or more illustrative aspects of the disclosure. Each arrow may represent a plurality of subcarriers on one or more channels (e.g., OFDM blocks). As illustrated, the subcarrier MERs may be relatively high at certain frequencies (e.g., at or near 40 MER) to the left and the right side. However, noise at a certain frequency or frequency band may be present in the system, and may reduce certain subcarrier MERs (e.g., near the middle). The noise may include sideband noise 1705 that reduces the MER of certain subcarriers. The noise may also be centralized at a certain frequency, which may significantly reduce the MER of some subcarriers.

Using the method steps and algorithms described above, the computing device may assign different modulation profiles to the subcarriers outside of the frequencies affected by noise, the subcarriers affected by sideband noise, and the subcarriers in the exclusion area 1710. In some aspects, the computing device may determine a minimum MER (or Shannon Capacity MER), such as 15 MER. With respect to the subcarriers affected by sideband noise, the computing device may calculate the channel capacity $C=\log_2(1+10^{15/10})=\log_2(1+31.6)=\log_2(32.6)=5.03$ bits per symbol. The computing device may use the floor function on C (e.g., floor[5.03]), which results in 5 bits per symbol. In order to calculate the modulation order, the computing device may apply the following formula: Modulation Order= $2^{floor[C]}=2^5=32$. Therefore, for an MER of 15 (which may be the minimum MER), the computing device may select 32 QAM as the modulation profile. If 32 QAM is not available, the computing device may select the next available (lower order) profile, such as 16 QAM, as illustrated in FIG. 17. Accordingly, the subcarriers affected by sideband noise 1705 may be assigned a modulation profile of 16 QAM. In some aspects, the computing device may further divide up these subcarriers and assign some of the subcarriers affected by sideband noise to high order modulation schemes.

With respect to the subcarriers not affected by noise, the computing device may calculate the channel capacity $C=\log_2(1+10^{40/10})=\log_2(1+10000)=\log_2(10001)=13.29$ bits per symbol. The computing device may use the floor function on C (e.g., floor[13.29]), which results in 13 bits per symbol. In order to calculate the modulation order, the computing device may apply the following formula: Modulation Order=$2^{floor[C]}=2^{13}=8192$. Therefore, for an MER of 40, the computing device may select 8192 QAM as the modulation profile. Accordingly, the one or more of the subcarriers not affected by noise may be assigned a modulation profile of 8192 QAM.

With respect to the subcarriers in the exclusion area 1710 (which may be significantly affected by the noise), the computing device may exclude these subcarriers from the calculation and create a different type of profile for these subcarriers, as described above with reference to at least FIGS. 8, 10, and 11. For example, the data for these subcarriers may be skewed. Once the computing device determines an updated modulation profile for a user device or a user device group, the computing device (or other back end device) may send instructions to the user device(s) or user device group(s) to change to the new modulation profile.

Alternative methods of measuring error ratio may be used, such as measuring receive (or transmit) power. With respect to cable modems, there may be plenty of DOCSIS 3.0 devices present in the network during the transition to DOCSIS 3.1 devices. These DOCSIS 3.0 devices may be instructed to scan and measure OFDM subcarriers from DOCSIS 3.1 transmissions, even if the DOCSIS 3.0 devices are not able to fully take part in these conversations. In some aspects, the frequency spectrums utilized by the DOCSIS 3.0 devices may be channelized. The system may use the carrier receive power (e.g., instead of MER) to determine the appropriate modulation profile using the methods previously described. In some aspects, if a channel has a large loss of power, a lower order modulation scheme may be used for that channel.

The population density of DOCSIS 3.0 devices to DOCSIS 3.1 devices may lean towards 3.0 for many years during the transition period. This transition period may be protracted. As previously described, demodulating OFDM subcarriers (including MER data) may provide a feedback mechanism for profile selection. A similar method may be achieved using existing user devices (e.g., the existing population of DOCSIS 3.0 cable modems). While these modems might not be able to participate in the DOCSIS 3.1 conversation, they can still measure signal quality. Depending on the DOCSIS 3.0 chip family, the capabilities may vary, but most or all of the devices can provide at least some data to a profile selection algorithm.

An existing deployed population of devices may be used to analyze and understand the profile domains within service groups, e.g., down to the amplifier or even smaller level. The performance of each spectrum may be used as a first order approximation prior to replacing the existing devices with new devices. Accordingly, service performance may be predicted before the existing devices are replaced. For example, the system may determine the best (or one of the best) physical layer links (PHY-links) for a given modem population of a given service group. Metrics for measuring quality may include speed and/or reliability. The system may look at physical layer assignments, and attempt to create maximum performance out of the subcarrier assignments for each group.

Various uses for aspects described herein are envisioned. First, the system may determine profiles before deploying DOCSIS 3.1-capable equipment. For example, DOCSIS 3.0 equipment may be tricked into providing information useful for transitioning to a DOCSIS 3.1 environment. These existing devices may be instructed to scan and measure, for example, OFDM subcarriers from DOCSIS 3.1 transmissions (e.g., from a termination system or other back end device), without actually being able to participate in the conversation. Accordingly, one type of device may be used to analyze the spectrum in preparation for the appointment of different types of devices. A device with a spectrum analyzer (e.g., a set top box) may be instructed to approximate which profile to assign to the new device when the new device joins the system. The new device may be temporarily assigned to a group based on the information from the legacy device, prior to upgrading to the new device. Accordingly, the population of existing devices (e.g., DOCSIS 3.0 devices) may be used to make the profile selection process for new devices (e.g., DOCSIS 3.1 devices) more efficient and faster.

Second, the system described herein may detect devices with broken or malfunctioning components, and assign new profiles for the devices with broken components (e.g., transmitters, receivers, memory, certain chips, etc.) such that the device functions with a particular quality of service (QoS). Many devices in the network (e.g., hundreds, thousands, or tens of thousands) may have broken or malfunctioning components, and it may be difficult to immediately fix or replace all of these broken components (or the device itself). Advantageously, the system may instead assign one or more new profiles to the devices with broken components so that the device at least functions as reliably as possible (with the broken component) and/or with a certain QoS.

Third, aspects described herein may be used to prioritize device upgrades (e.g., to DOCSIS 3.1). If the devices are performing poorly (e.g., low MER, low receive or transmit power, low SNR, broken component(s), other network issues, etc.), the system may prioritize upgrading these devices. For example, if these poor-performing devices are DOCSIS 3.0 devices, the system may prioritize their upgrade to DOCSIS 3.1 devices. In some aspects, the system may prioritize upgrades with or without first determining whether the system can improve their reliability and/or QoS by assigning a new profile.

A brief description of a method for determining modulation profiles will now be provided. A method described herein may comprise determining a plurality of devices in the network (e.g., mobile devices, set-top boxes, cable modems, etc.) that use a particular communication protocol, such as DOCSIS 3.0. A server or other back end device, such as a termination system, may receive, from one or more of these devices, data indicative of the signal quality at the device (e.g., receive power, transmit power, SNR, etc.). The system may channelize or otherwise divide up the spectrum for the devices. The system may determine (e.g., approximate) one or more subcarriers based on the channelization. The method may comprise determining an approximation of the receive power, such as via a subcarrier power analysis. The system may process the data, including the receive power, to generate one or more profiles for the existing network device and/or for future devices expected to replace the existing devices.

A computing device may determine a plurality of devices in the network (e.g., mobile devices, set-top boxes, cable modems, etc.) that use a particular communication protocol, such as DOCSIS 3.0. As described above, the plurality of devices may comprise a particular group of devices, such as a serving group or a group of devices in a particular region or area.

The computing device may receive, from one or more of the plurality of devices in the network, data indicative of the signal quality at the device. As noted above, the data may comprise MER data. However, if the MER data is not available or feasible for the device, the device may send other types of data indicative of signal quality, such as receive power, transmit power, SNR, etc.

Figure 18:
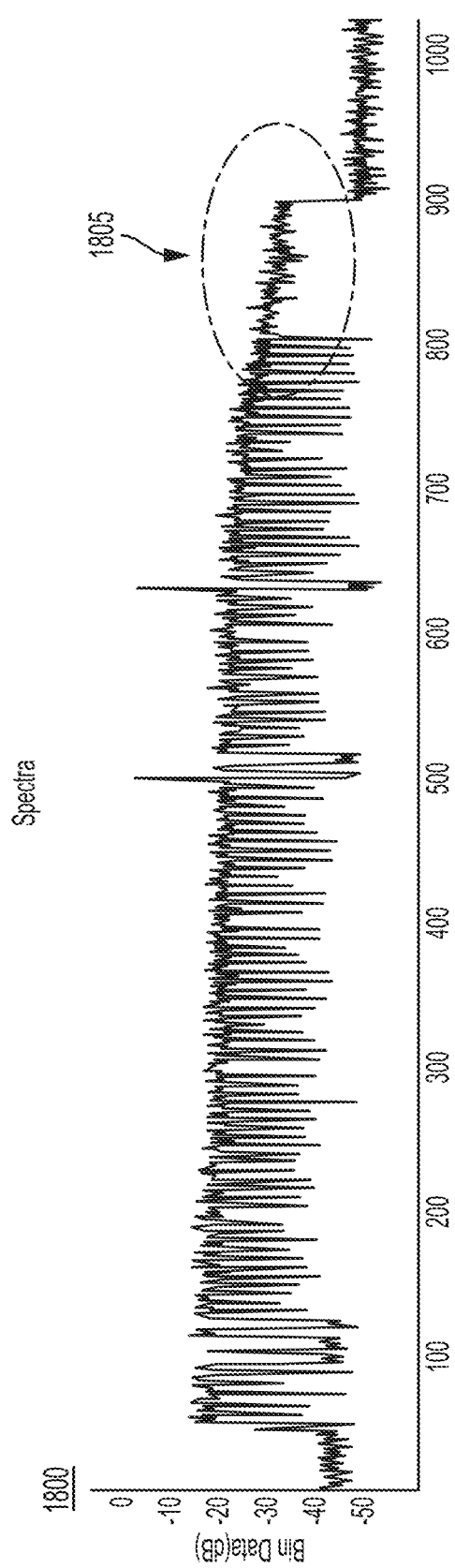
FIG. 18 illustrates an example of spectrum data from a device in the network according to one or more illustrative aspects of the disclosure.

FIG. 18 illustrates an example 1800 of spectrum data from a device in the network according to one or more illustrative aspects of the disclosure. For example, the data may comprise raw spectrum from a DOCSIS 3.0 device (e.g., an existing set top box). The computing device may receive spectrum data from numerous devices, such as 18 million devices, 34 million devices, or any other number of devices. The spectrum may include an OFDM signal 1805, such as a DOCSIS 3.1 OFDM signal, as circled in red in FIG. 18. Accordingly, the computing device may receive some measurement of the OFDM channel, including one or more (e.g., all) of the subcarriers.

Figure 19:
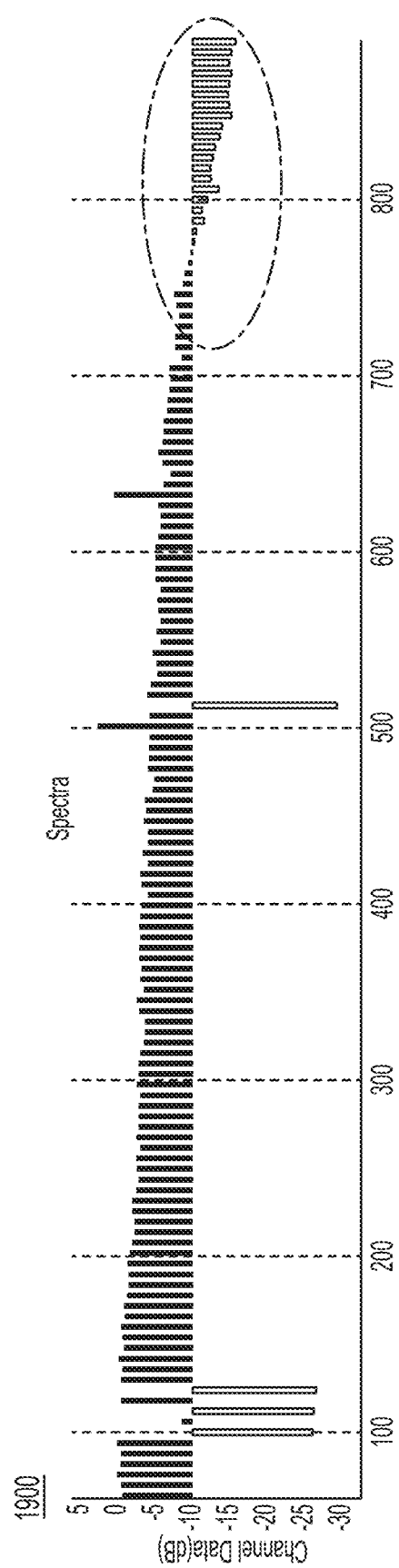
FIG. 19 illustrates an example of channelized spectrum data according to one or more illustrative aspects of the disclosure.

The computing device may channelize or otherwise divide up the spectrum (e.g., the raw spectrum data) for the devices. The computing device may channelize individual subcarriers, and the channelized data may be provided to the profile management routine previously described. FIG. 19 illustrates an example 1900 of channelized spectrum data according to one or more illustrative aspects of the disclosure. Any channel width may be used. FIG. 19 illustrates dividing a spectrum up to a channel width of 6 MHz. Each channel may comprise a plurality of subchannels. For example, if a subchannel is 50 kHz, the 6 MHz channel may be divided into 120 subchannels, each subchannel having a corresponding subcarrier. The system may additionally or alternatively channelize at a subcarrier level. In this example, the subcarriers have been channelized in 6 MHz blocks, but data could be processed at any resolution.

The computing may determine (e.g., approximate) one or more subcarriers based on the channelization. For example, instead of having six MHz channel blocks, the computing device may look at actually subcarriers. As will be described below, instead of (or in addition to) using subcarrier MER or subcarrier LDPC performance as described above, the computing device may use subcarrier receive power, and input the subcarrier receive power into the algorithm described above to determine one or more modulation profiles.

The computing device may determine an approximation of the receive power, such as via a subcarrier power analysis. In some aspects, a gross approximation on a subcarrier basis may be performed. In some aspects, one or more existing devices might not have the capability within, e.g., its tuner to lock the subcarriers. However, the device may be able to precisely dial in the start and stop frequencies and/or the periodicity of the subcarrier spacing so that the device can very accurately measure the receive power of each individual subcarrier. Accordingly, these devices may use spectrum power measurement to add to the feedback/decision making tree noted above.

In the context of DOCSIS 3.0 devices, many or most of these devices may be able to participate using raw spectrum analysis. The OFDM subcarriers can be soft-tuned and measured for sub carrier power. This may provide a coarse-grained understanding of the subcarrier channel performance, including the effect of certain RF issues, such as rolloff, notching, and suckouts.

The computing device may process the data, including the receive power, to generate one or more profiles for the existing network device and/or for future devices expected to replace the existing devices. Based on the data, the computing device may identify one or more channels or one or more subchannels that have a huge loss on it. The computing device may configure the device group that operates using those channels or subchannels with a lower modulation order. There are several different ways of grouping devices together, including the clustering technique described above, cross-correlation routines, and linear graphing, among other types of algorithms.

Figure 20:
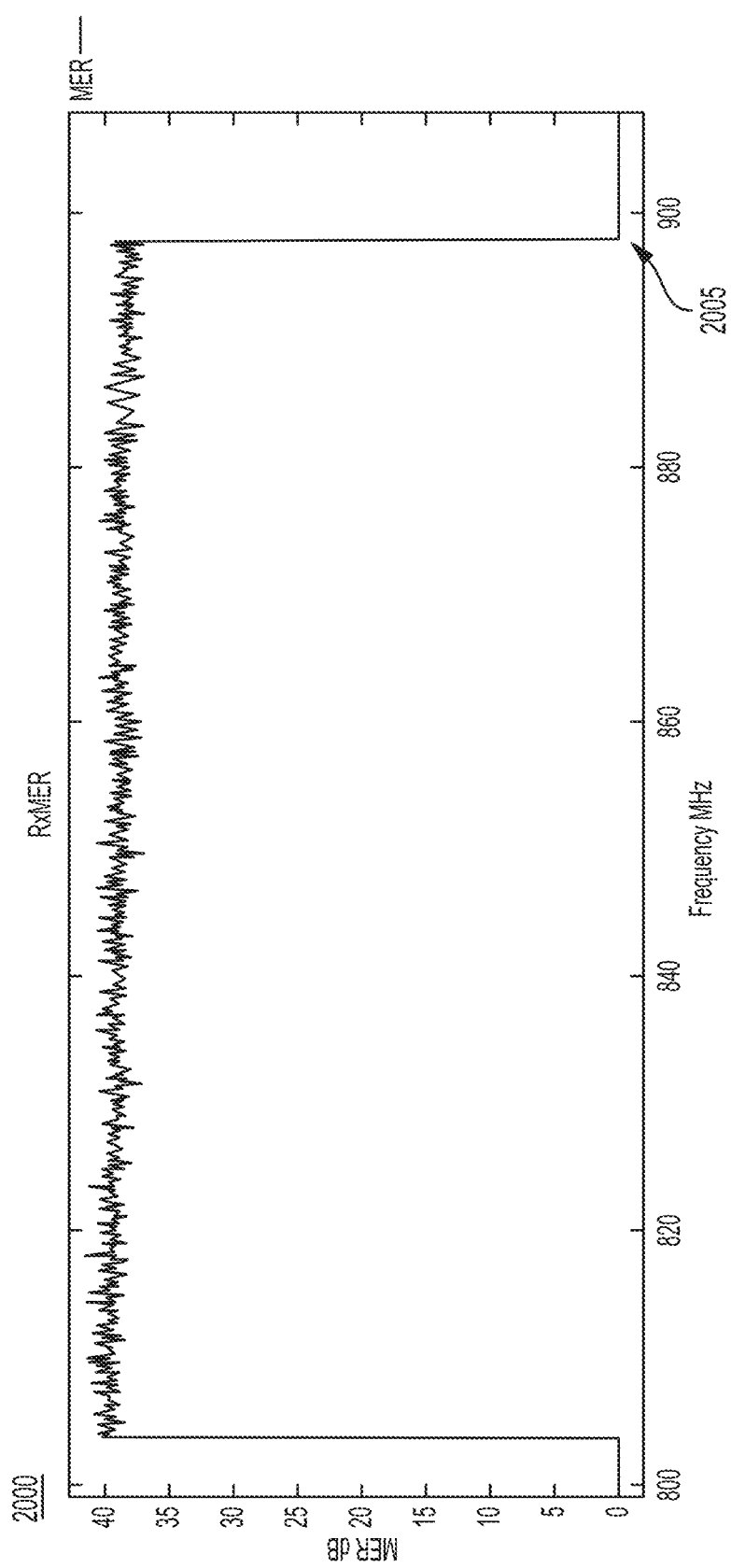
FIG. 20 illustrates an example of MER versus frequency according to one or more illustrative aspects of the disclosure.

FIG. 20 illustrates an example 2000 of MER (e.g., OFDM MER) versus frequency according to one or more illustrative aspects of the disclosure. Absent from FIG. 20 are the standard deviations and population variances. However, the data may be used to inform the standard deviations and/or population variances. FIG. 20 illustrates a spectrum between approximately 800 and 900 MHz. Above 880 MHz and below 900 MHz, the computing device may start to see an MER drop-off or tailoff 2005. This may show the total population measurements of the MER frequency and what the computing device decides to do. The computing device may also calculate a cross-correlation of power and MER (not illustrated).

Another representation of the data may comprise frequency versus power (e.g., instead of or in addition to frequency versus MER, as illustrated in FIG. 20). Based on the received data, the computing device may approximate a subcarrier to noise ratio. That is, while the user device might not actually be able to demodulate a certain type of signal (e.g., using MER data), the computing device may extrapolate MER data based on power data received from the population of devices. This is because the power profile of a subcarrier may have a cross-correlation to the MER of that subcarrier. Because of the strong statistical correlation, the computing device may make sub-approximations of what service group to initialize a new device (e.g., a DOCSIS 3.1 modem) in before having actual MER data. Advantageously, modulation profiles may be selected before DOCSIS 3.1 devices are rolled out.

Figure 21:
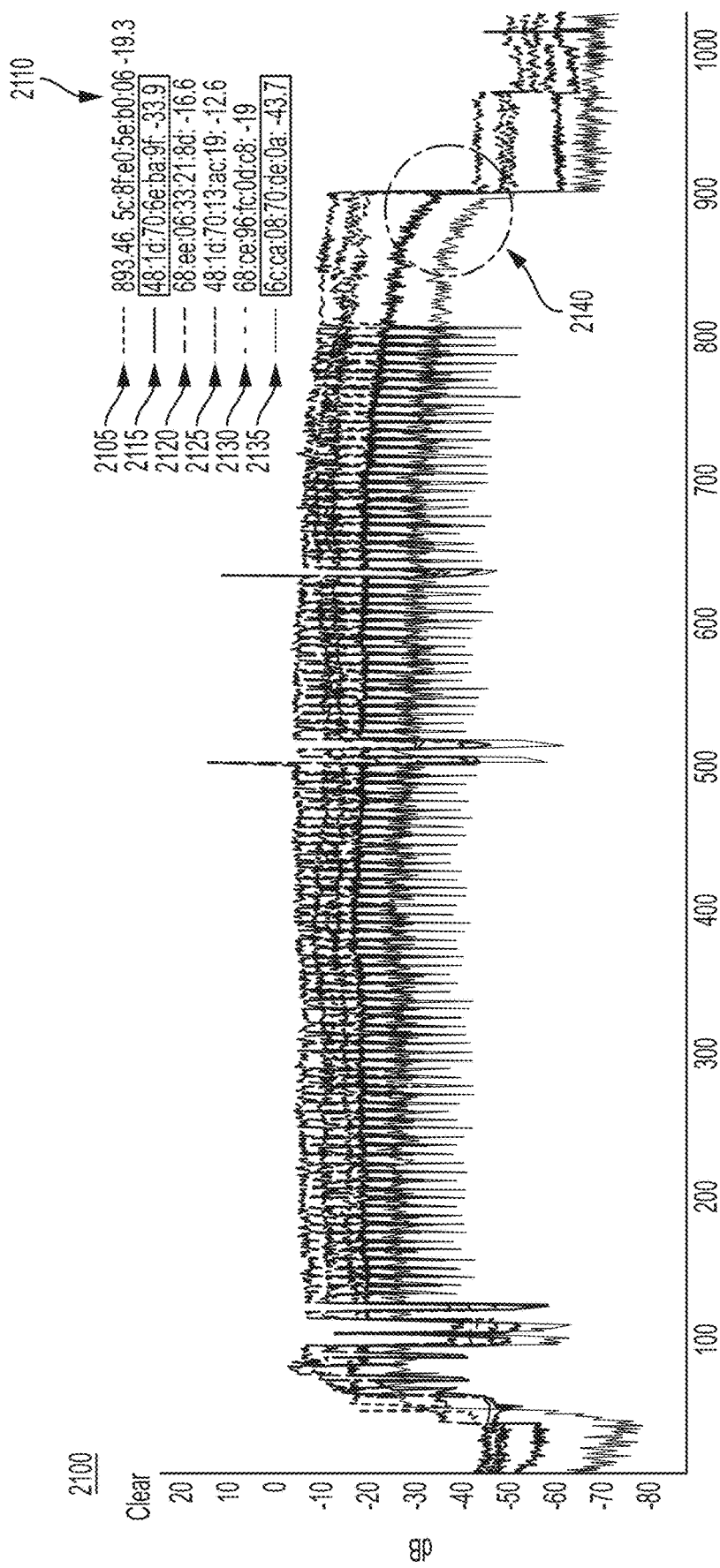
FIG. 21 illustrates an example of OFDM analysis using non-OFDM devices according to one or more illustrative aspects of the disclosure.

FIG. 21 illustrates an example 2100 of OFDM analysis using non-OFDM devices according to one or more illustrative aspects of the disclosure. The Y axis may be BIN-power, and the X axis may be frequency. An exemplary OFDM channel may be between 800 and 900 MHz. The computing device may select an individual frequency marker for analysis, such as 893.46 MHz (indicated at the top right of the graph 2105). Data from different devices (e.g., DOCSIS 3.0 devices) may be represented in different colors (e.g., purple, black, red, green, yellow). The devices may be in the same group, such as a service group. The different devices may be indicated by their MAC address or other identifier. The first device 2110 (indicated in red) may have a power of −19.3 dB. The second device 2115 (indicated in brown) may have a power of −33.9 dB. The third device 2120 (indicated in blue) may have a power of −16.6 dB. The fourth device 2125 (indicated in yellow) may have a power of −12.6 dB. The fifth device 2130 (indicated in orange) may have a power of −19 dB. The sixth device 2135 (indicated in purple) may have a power of −43.7 dB.

As illustrated in FIG. 21, two devices at the frequency marker of 893.46 MHz may have excessive rolloff (e.g., the second device 2115 with a power level of −33.9 dB and the sixth device 2135 with a power level of −43.7 dB). These devices may be eligible for a special profile, replacement, etc. Where there is a red circle 2140 around the two traces for those devices, there may be a cluster of devices that experience degraded performance because the receive power is experiencing a low loss. That may be caused by a piece of equipment that is damaged or not supposed to be there. In some aspects, devices with rolloff may have broken components. Accordingly, the system may proactively identify network elements that might need repair. However, numerous broken devices may exist, and not all of them can be immediately repaired. Instead, the system may assign an appropriate profile so that the device functions as reliably as possible, e.g., prior to repair, replacement, upgrade, etc.

Figure 22:
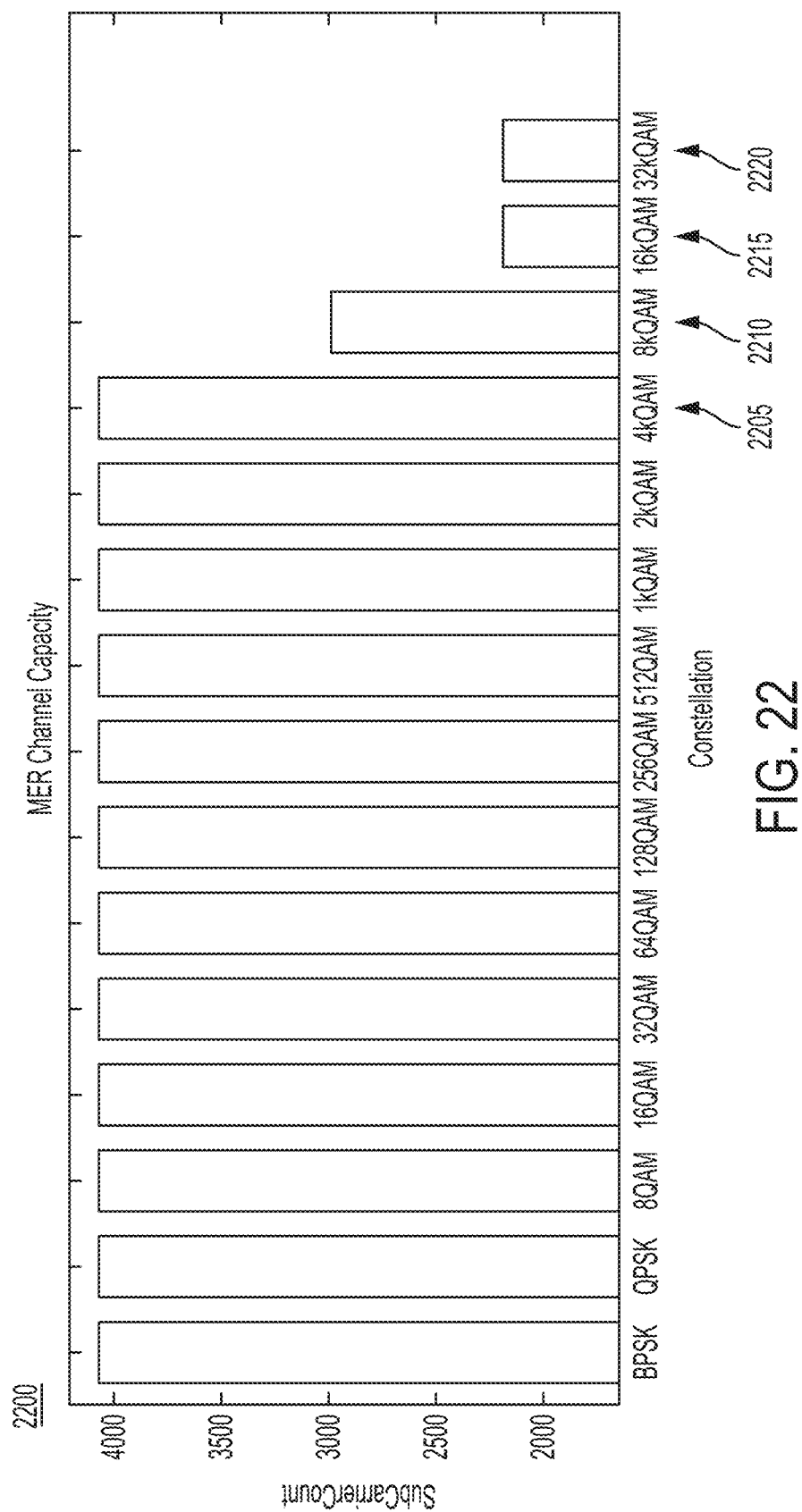
FIG. 22 illustrates an example of a subcarrier count per modulation order according to one or more illustrative aspects of the disclosure.

FIG. 22 illustrates an example 2200 of a subcarrier count per modulation order according to one or more illustrative aspects of the disclosure. For example, the data may indicate OFDM Shannon Channel Capacity versus bits-per-symbol of a single OFDM, such as via PNM MER RxData. As illustrated, 4K QAM 2205 may be the maximum channel capacity without error (theoretical). However, the system may attempt to squeeze in well-functioning devices at 8K QAM (or higher) at certain frequencies. As previously described, Shannon analysis may be performed to determine the performance based on the MER. Certain frequencies may perform better than others, and in particular, the devices that tailoff might not perform as well.

Each bar illustrated in FIG. 22 may indicate, based on Shannon's limit, the subcarriers within Shannon's limit for each individual constellation or modulation order. At the current snapshot of the MER capture, the system may determine that every subcarrier can support 4K QAM. Every subcarrier can also support 256 QAM, 512 QAM, among other lower order QAMs. Approximately 3000 subcarriers, which may be a little more than half of the subcarriers, may support 8K QAM 2210. As one moves to higher-order modulations, fewer and fewer subcarriers may be supported. Approximately 2,200 subcarriers can go to 16K QAM 2215 or 33K QAM 2220. As previously described, because the system knows which subcarriers do not support higher modulations, the system may compute the standard deviation for each subcarrier and group the subcarriers by frequency. Accordingly, the system may be able to tailor a high performance OFDM because the system knows which subcarriers can perform over time and make the best estimation. From this, the system may determine/customize groupings based on modem population.

Figure 23:
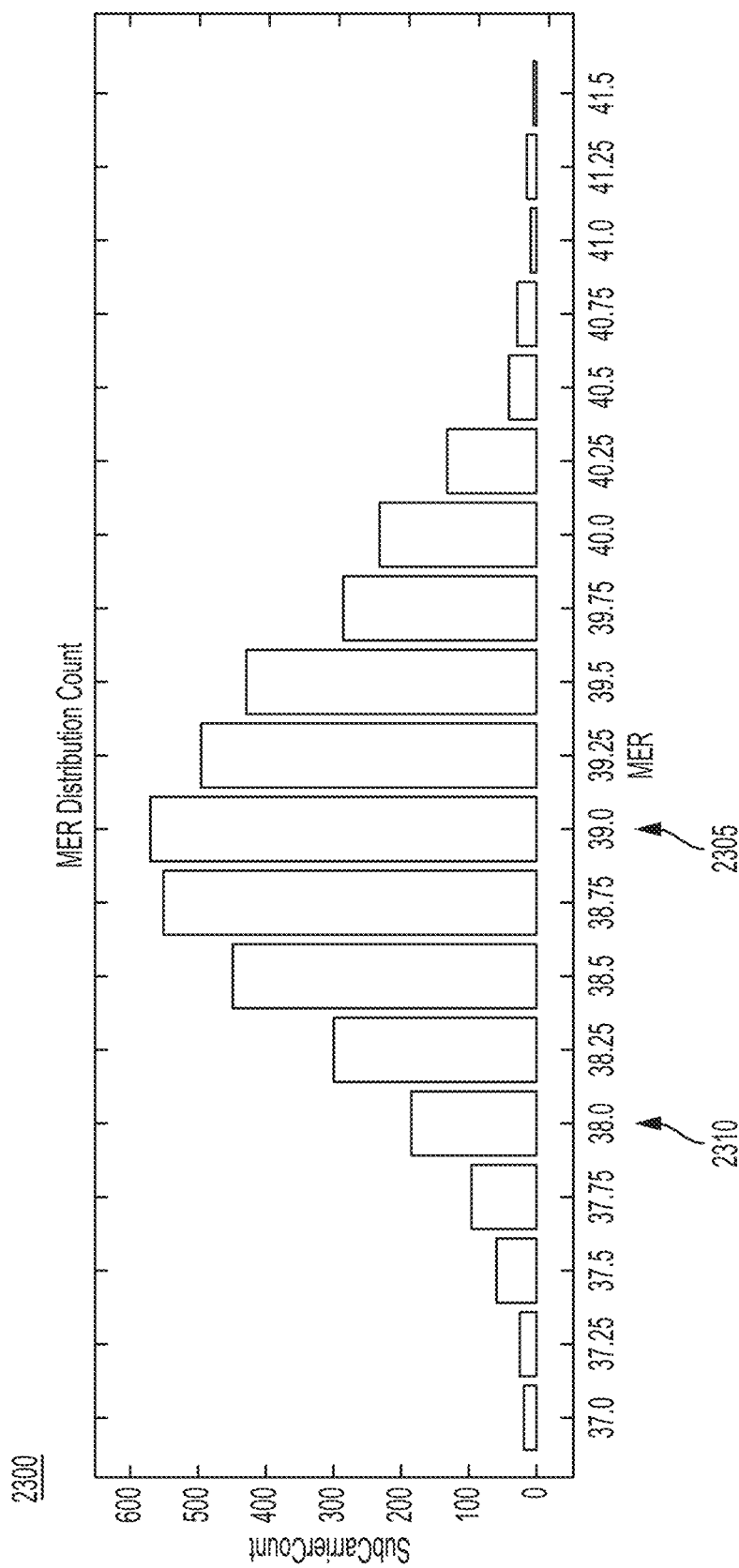
FIG. 23 illustrates an example of MER distribution of a single OFDM channel according to one or more illustrative aspects of the disclosure.

FIG. 23 illustrates an example 2300 of MER distribution of a single OFDM channel according to one or more illustrative aspects of the disclosure. The data represented in FIG. 23 may be taken from the same RxMER data capture as FIG. 22. FIG. 23 illustrates the distribution of the subcarriers. Two deviations may be performed: one per subcarrier of a given population of devices and another over frequency in order to determine the best contiguous number of subcarriers that can perform at a high level. The mean MER 2305 may be around 39, and the first standard deviation 2310 may be around 38. This may give the system 66% coverage of the devices. The system may determine minimum and maximum values.

Figure 24:
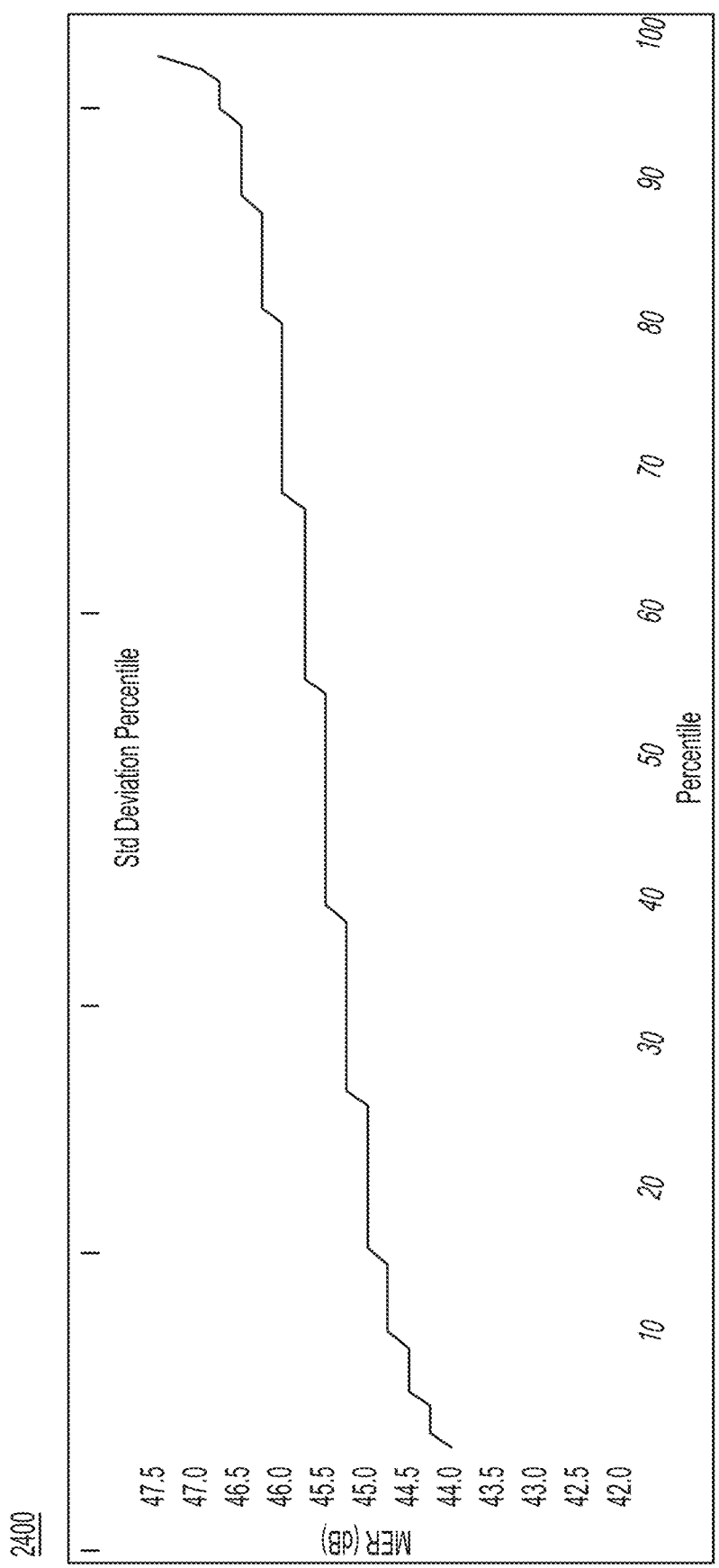
FIG. 24 illustrates an example of standard deviation of MER versus percentile of a single OFDM channel according to one or more illustrative aspects of the disclosure.

FIG. 24 illustrates an example 2400 of standard deviation of MER versus percentile of a single OFDM channel according to one or more illustrative aspects of the disclosure. The data illustrates an S-curve response.

Various additional implementations are possible. Many existing (e.g., DOCSIS 3.0) devices may utilize software defined radios (SDR), which can be field upgraded. One or more of these devices may be able to demodulate OFDM pilot signals once they are field upgraded. This may provide better visibility to additive interference, such as LTE, GSM, and VHF. In this case, the technique described above may be applied. However, the algorithm may use a more comprehensive set of data for determining modulation profiles or to determine devices that require repair or replacement. In addition to power data, the algorithm may receive data such as MER data, LDPC/FEC performance data, and the like.

Aspects described herein may also be used for performance certification of certain types of devices, such as DOCSIS 3.1 devices and/or service groups. Communications operators may use the technique to identify problematic areas in the spectrum, prior to deploying DOCSIS 3.1 devices.

Aspects described herein may also be useful for anticipating the maximum throughput for one or more customer before the customer is offered a service. For example, if the neighborhood only supports 256 QAM, then the maximum speed may be less than with 1024 QAM. The customer may be informed of the type of service the customer is expected to receive.

In some aspects, one or more of the analyses (e.g., steps or algorithms) described above may be performed on either the server-side or the end-point device side. In some aspects, end-point devices conditioning data before sending the data to the server (e.g., termination system and/or CMTS) may result in technical efficiencies in storing and processing data.

DOCSIS 3.1 provides frequency and time domain information analysis that may be offloaded to an external analysis and analytical tool. The device (e.g., cable modem) may expose functionality to a user to perform an analysis. In some aspects, an endpoint may comprise a Proactive Network Monitoring/Maintenance (PNM) tool. The system may include an external analysis tool, such as a Profile Management Application (PMA) tool.

Various advantages are envisioned from endpoint processing. A technician can come in and use frequency spectrum analysis tools in the endpoint to analyze the RF signal reaching the endpoint. The analysis may be used on devices in different rooms of a house or other structure, and based on the analysis, the technician may learn a lot about the RF backbone network and RF network into each room. Additionally, the technician may obtain help by having the data monitored remotely at, for example, the head end. The second level help could log on and see what the technician is seeing and help the technician analyze the data.

One or more analysis and analytical tools may be moved on to the endpoint, removing the need to access an external tool as a proxy. Operations, such as on-demand scheduling for data, may be moved from the external tool into the endpoint. This may allow the external tool to collect data as it comes in and perform operation and decisions on how to address issues that the endpoints have collected. For example, the system may collect PNM data and react based on massive polling of a polarity of devices and CMTSs, as previously described. In some aspects, the polling may be reduced by instructing the device by performing the analysis on the device and automatically upload the data to a repository for later aggregate analysis. In other words, some analysis may be moved over to an endpoint to alleviate the hardship and mass amounts of data that is going to be performed at the central point. For example, in the field, analysis can be put on the client devices. A technician may come in and can leverage the device itself as the tool.

In some aspects, a device, such as a cable modem, may measure the MER and forward the per-subcarrier MER to a PNM application, which may be used to perform statistical analysis on the received data. For example, the received data may be used to determine modulation schemes for one or more subcarriers. The device may perform one or more transformations of the data before sending the data to a central location. The device may use a built-in (or external) RF spectrum analyzer, vector analyzer (e.g., a small scale vector analyzer), and/or network analyzer (e.g., a small scale network analyzer) to perform these transformations. For example and in a cable environment, a network analyzer in conjunction with a CMTS may be used to determine the health of the CMTS, the health of the modem's front end, and the quality of data between the two points.

A cable modem and the CMTS may work in conjunction. The CMTS may indicate that it is going to send the cable modem information, and the cable modem may receive the information having a particular time stamp. The cable modem may implement one or more algorithms to determine the expected values versus the values indicated by the information it has received. The cable modem may upload that data in a particular format, such as raw format. The data may comprise coefficients of the OFDM. The CMTS may perform additional analyses based the data it receives from the cable modem.

A network analyzer may measure certain details, such as reflections and transmissions. The network analyzer may send out various parameters, such as S parameters, Y parameters, and Z parameters. Those signals may be analyzed. One end might send down a test signal, analyze the signal at the other end, and then have the ability to adjust various parameters for amplifiers and filters. In some aspects, S parameters might not be done at the cable modem, but rather during post analysis (e.g., post capture).

The end point device may include a channel estimator. A channel estimation may be performed by using one or more coefficients to determine one or more vector errors. The amount of error may be determined based on the channel estimation.

The end point device may include a vector analyzer. The vector analyzer may analyze frequency domains, modulation domains, code domains, time domains, etc., in order to determine what OFDM subchannels and which modulation schemes are supported. The end point device may request appropriate modulation schemes.

In some aspects, user interfaces may be provided to allow a user, technician, or engineer at the location of the endpoint to access particular data and analytics. The user may use an external tool or browser to view RF signals and perform analyses that originate at the endpoint.

RxMER values may be included in a file, such as a binary file. The first 20-30 bytes of the file may identify the cable modem, when the data capture occurred, what downstream channel was used, the MAC address, the start frequency, among other information. The following data may comprise one or more magnitude values. Consecutive magnitude values may correspond to each individual subcarrier.

In some aspects, an external system may leverage the computing powering of the endpoint by having the endpoint perform the mathematical operation(s) on the data (e.g., raw data) that might typically be performed at the external system. This may be incorporated into a software stack for the endpoint. In other words, a distributive architecture may be used, and analysis may be pushed off to the endpoint. One advantage of the distributive processing system is that a technician that might not have the credentials to access certain core backbone system features and analysis tools, might be able to access information at the endpoint.

In some aspects, the endpoint may be instructed to automatically upload the data at any time interval and iteration. For example, a job may be set up job on the endpoint. The central system may go out to the devices and instruct a routine upload of data at a particular interval, e.g., instead of constant interaction of the central systems requesting data. Advantageously, traffic may be alleviated on the control plane between the central server and the distributor endpoints.

The network may add the ability for endpoints to perform some analysis and upload the data to a more centralized location that could either poll dynamically the endpoint or and perform additional analyses to draw conclusions. In some aspects, the analysis may be performed across the larger spectrum of the network, and not just on a particular endpoint. By collecting the data and processing the data, the system may identify the correct location in the network that the error is occurring. This may inform appropriate deployment of remedies to fix the error(s). As such, the network might save resources by not sending a technician to a user location (e.g., a house) if the error is in the node or in the head end. Accordingly, resources may be placed where the error is, and these errors can be located.

Additional processing may be performed in the backend. For example, a portion of the data from the DOCSIS cable modem (or from any other endpoint) may be moved to a central computer for processing, and the central computer may perform analysis on thousands of endpoint devices.

In some aspects, generating modulation profiles or adaptive bit-loading may result in a significant amount of data generated and/or stored. For example, assume that each OFDM data capture by a user device contains 8 KB of data per 192 MHz OFDM channel, which may be, for example, up to 2 per user device for 16 KB per user device. An estimate of 500 user devices per serving group (SG) may result in 8 MB of data from a single capture event. An exemplary sample interval of every 6 hours may result in 32 MB of data from a single serving group per day. Assuming, for example, 6 million user devices (e.g., cable modems), the resulting data storage may be 384 GB:

6 Million CM/500 CM Per SG=12000 SG*32 MB (per day)=$3.84 \times 10^{11}$=384 GB of daily storage In order to reduce the amount of data being handled (and stored), each user device (e.g., endpoint) may process data (e.g., MER data) prior to sending the data to a server (e.g., a PNM server) for central processing and/or may notify the server if there the user device detected a positive or negative RF event. The endpoint may process the MER data and then report the data upon boot up or when there is a negative or positive RF event. As will be described in further detail below, the cable modem may perform, for example, second-by-second monitoring (or any other monitoring interval) of the MER (e.g., RxMER), and can determine a predictive modulation profile based on the MER data. The algorithm used to determine the predictive modulation profile may be similar to (or the same as) the algorithm described above for determining a modulation profile. The endpoint may perform these processes continuously, and/or off line and can report to the server when a significant change in fidelity is experienced. The server may collect the data upon startup of the CMTS and/or SG, and may place the new predictive bit-load profile, compare real-time data against other endpoints, and create a modulation profile that some, most, or all of the endpoints can support.

Aspects described herein may result in several technological improvements. First, they may reduce complexity of computation by the server. Second, they may significantly reduce data storage. Third, they may improve the accuracy of generating modulation profiles. Fourth, they may significantly reduce network polling of user devices. Fifth, they may allow more control over the software implementation, reducing the need for implementation by third parties, such as vendors.

Examples of the amount of data storage that may be saved in various scenarios for once a day monitoring, a serving group of 500 user devices, and 12,000 serving groups total will now be provided. For a worst case scenario (e.g., if every cable modem experiences a change in RF fidelity): 16 KB per CM*500 per SG=8 MB*12000 SG=96 GB of daily storage. If 10% of the cable modems experience RF fidelity issues: 16 KB per CM*50 per SG=8 MB*12000 SG=9.6 GB of daily storage. If 2% of the cable modems experience RF fidelity issues: 16 KB per CM*10 per SG=160 KB*12000 SG=1.92 GB of daily storage.

Figure 25:
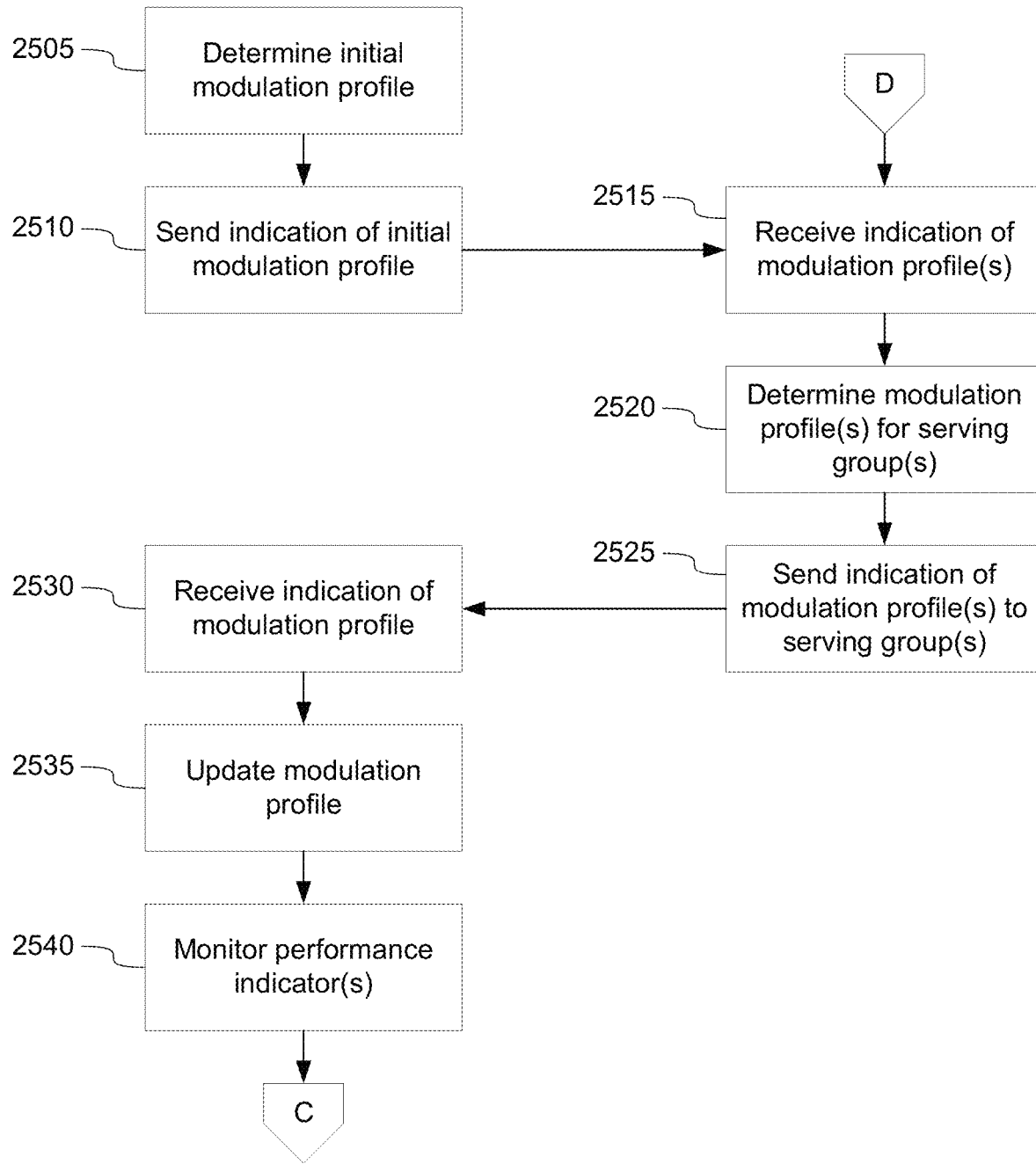
FIG. 25 illustrates at least a portion of a method for determining one or more data modulation profiles for a device or groups of devices according to one or more illustrative aspects of the disclosure.

FIG. 25 illustrates at least a portion of a method for determining one or more data modulation profiles for a device or groups of devices according to one or more illustrative aspects of the disclosure. In step 2505, a device may determine (e.g., estimate) an initial modulation profile using one or more of the concepts described above. For example, the device may estimate the initial modulation profile based on the MER, receive or transmit power, or any other metric of signal quality previously described. The modulation profile may comprise the device's determination of a best fit based on RF fidelity. The device may determine the initial modulation profile upon boot-up or sometime thereafter (e.g., 30 seconds after boot-up). In step 2510, the device may send an indication of the initial modulation profile to a server, such as a network management server.

In step 2515, the server may receive the indication of the initial modulation profile from the device. The server may similarly receive indications of initial modulation profiles from a plurality of other devices, such as devices in the same serving group (or not in the same serving group). In step 2520, the server may determine one or more modulation profiles, such as generic modulation profile, for one or more serving groups, which may be per OFDM channel. The server may determine the modulation profiles according to one or more of the concepts described above, such as illustrated in FIGS. 4 and 8-16. The server may assign each device to a particular modulation profile of the plurality of modulation profiles determined by the server. In some aspects, the server may attempt to assign the device to its initial modulation profile. In other aspects, the server may assign the device to a modulation profile different from its initial modulation profile. In step 2525, the server may send, to each device, an indication of its determined modulation profile. In some aspects, devices in the same serving group may be assigned to the same modulation profile.

In step 2530, the device may receive, from the server, the indication of the modulation profile. In step 2535 and if applicable (e.g., the modulation profile is changed), the device may disregard its current modulation profile and accept the modulation profile assigned by the server. In step 2540, the device may monitor, such as during operation, certain performance indicator(s) (e.g., key performance indicators (KPI)) and use the monitoring to determine whether a new modulation profile might be needed. One example of a KPI is forward error correction (FEC).

Figure 26:
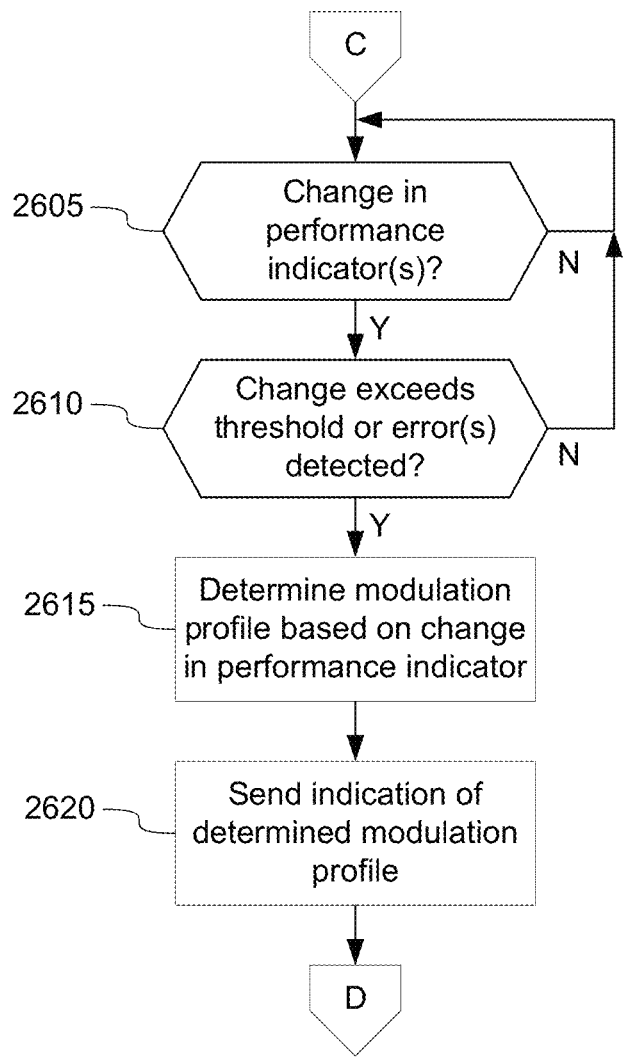
FIG. 26 illustrates at least a portion of a method for determining one or more data modulation profiles for a device or groups of devices according to one or more illustrative aspects of the disclosure.

FIG. 26 illustrates at least a portion of a method for determining one or more data modulation profiles for a device or groups of devices according to one or more illustrative aspects of the disclosure. In step 2605, a device may monitor one or more performance indicator(s), such as FEC, to determine whether a change in modulation profile may be warranted. If not (step 2605: N), the device may continue to monitor the performance indicator(s). If so (step 2605: Y), the device may proceed to step 2610.

In step 2610, the device may determine whether the change in one or more performance indicator(s) exceeds a threshold and/or whether errors have been detected in data transmission or reception. That is, the device may monitor its RF fidelity to determine whether to trigger an event for reevaluation of its modulation profile. If the change does not exceed the threshold (step 2610: N), the device may return to step 2605 to monitor one or more performance indicator(s). If the change does exceed the threshold (step 2610: Y), the device may proceed to step 2615.

In step 2615, the device may determine a modulation profile based on the change in the performance indicator(s). How the device determines the modulation profile was previously described, and may be based on, for example, MER, received or transmitted power, or any other metric of signal quality. In step 2620, the device may send, to the server, an indication of the determined modulation profile. As previously described with reference to FIG. 25, the server may receive the indication and determine one or more updated modulation profiles for the device or other devices. In some circumstances, a CM may monitor its KPI for no errors and recalculate its suggested modulation profile for consideration for an improved modulation profile. In some circumstances, the CM may monitor its KPI for errors and recalculate its suggested modulation profile for consideration for a more robust modulation profile.

As previously described, the user device and/or the network management server (e.g., a computing device) may determine a modulation profile based on a metric of signal quality, such as MER or received or transmitted power. Another example of determining the modulation profile will now be described. In some aspects, the user device and/or the network management server may take either a single subcarrier MER or a range of contiguous MER subcarriers, and map it to a modulation profile (e.g., scheme) based on the number of subcarriers.

Figure 27:
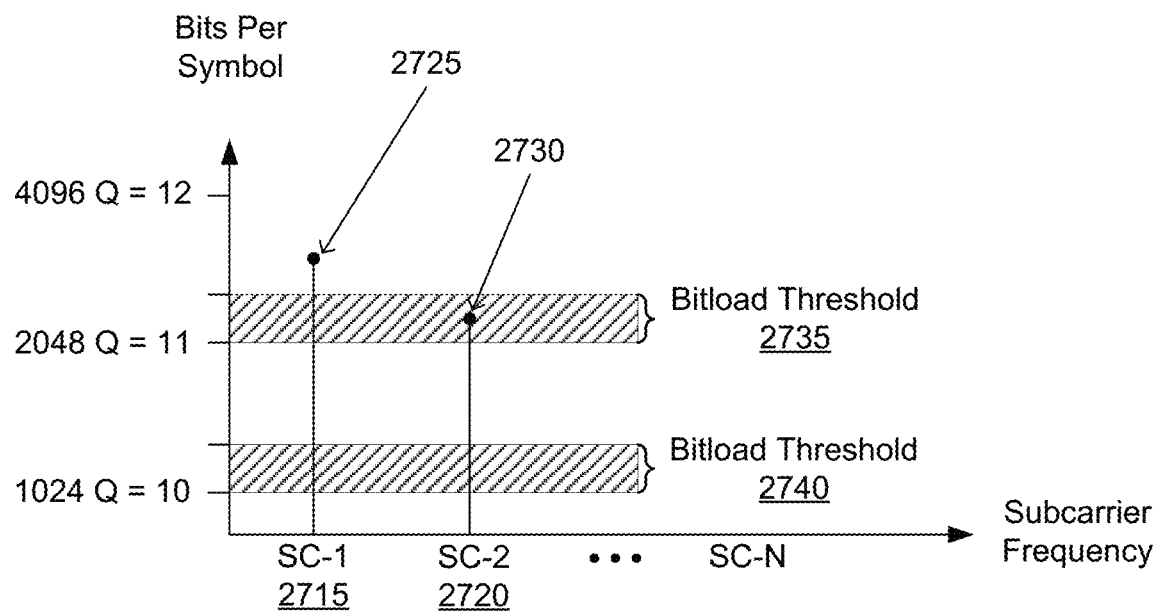
FIG. 27 illustrates an example of bitload thresholds according to one or more illustrative aspects of the disclosure.

FIG. 27 illustrates an example of bitload thresholds according to one or more illustrative aspects of the disclosure. In a single subcarrier scenario, the computing device may determine the MER (e.g., MER 2725) for the subcarrier ($MER_{SC}$), such as SC-1 2715. The computing device may determine the raw bitload ($Bitload_{Raw}$) based on the $MER_{SC}$:

$$Bitload_{Raw} = \text{Log}_2\left(1 + 10^{\frac{MER_{SC}}{10}}\right)$$

The computing device may determine the bitload by using a floor function on the raw bitload:

Bitload=floor($Bitload_{Raw}$)

The computing device may then calculate a bitload threshold (BitloadThreshold %):

BitloadThreshold %=($Bitload_{Raw}$−Bitload)*100

The computing device may compare the calculated bitload threshold with a set bitload threshold (e.g., a predetermined threshold), such as the bitload threshold 2735 or the bitload threshold 2740 illustrated in FIG. 27. Based on the comparison, the computing device may determine whether to leave the bitload according to the floor function or to decrease the bitload by 1. The following presents exemplary pseudo code for the comparison:

```
if(BT < SBT) {
    Bitload = Bitload −1; // Decrease Bitload by 1
} else if (BT >= SBT) {
    Bitload = Bitload; // No Change
}
```

By comparing the thresholds, the computing device may generate a safety or grace range to prevent losing data. In other words, the thresholds may be used so that the MER is not too close to an edge such that when the MER falls below the edge, the MER might no longer be discernible and data might be lost. As a result, the user device might not be at a modulation order higher than it can support. Once the bitload is determined, the computing device may calculate the modulation order (and consequentially the modulation profile) as follows:

Modulation Order=$2^{Bitload}$

For example, if the bitload is 10, the modulation order may be 1024 QAM. If the bitload is 11, the modulation order may be 2048 QAM. If the bitload is 12, the modulation order may be 4096 QAM, and so forth. With reference to FIG. 27, a computing device may determine that the MER 2725 for a first subcarrier 2715 is above a bitload threshold 2735 (e.g., a threshold set at 40%). Accordingly, the computing device may determine to maintain the bitload for the first subcarrier 2715 at a bitload of 11 (and consequently a modulation order of 2048 QAM). On the other hand, the computing device may determine that the MER 2730 for a second subcarrier 2720 is not above the bitload threshold 2735 (e.g., 40%). Accordingly, the computing device may determine to reduce the bitload for the second subcarrier 2720 by 1. The second subcarrier 2720 may be assigned a bitload of 10 (and consequently a modulation order of 1024 QAM). Other bitloads may also have thresholds. For example, a bitload of 10 may have a bitload threshold 2740, which may be the same as the bitload threshold 2735 (e.g., 40%) or different from the bitload threshold 2735 (e.g., 10% or 50%).

An example for a single carrier will now be provided. Assume that the MER for the carrier is 36.9 dB. The computing device may determine the following:

$$Bitload_{Raw} = Log_2\left(1 + 10^{\frac{36.9}{10}}\right) = 12.25$$

$$Bitload = floor(12.25) = 12$$

$$BitloadThreshold\ \% = (12.25 - 12) * 100 = 25\%$$

In this example, assume that the predetermined bitload threshold is 40%. The computing device may determine to decrease the bitload by 1 because the calculated bitload threshold is less than the predetermined bitload threshold. Accordingly, the bitload may be set to 11, and the modulation order may be 2048 QAM.

In a subcarrier range scenario, the computing device may determine the number of subcarriers in the range based on the frequency band and the subcarrier spacing. An example of a frequency band of 1 MHz and a subcarrier spacing of 50 KHz is used:

$$\frac{OFDM\ \text{Frequency Band (Hz)}}{\text{Subcarrier Spacing (Hz)}} = \frac{1000000}{50000} = 20\ \text{Subcarriers}$$

The computing device calculate a sum of the standard deviations across each subcarrier in the frequency band:

$$\sum_{i=0}^{n=20} SD(MER_{Sub}[i])$$

i=subcarrier index; $MER_{Sub}$=MER Per Sub Carrier; SD=Standard Deviation or Statistical Descriptive Function The computing device may calculate the mean MER:

$$\mu = MER_{Mean}$$

The computing device may also calculate the MER value any number of standard deviations from the mean, such as three standard deviations from the mean:

$$-3\sigma = 99.37\%\ \text{Coverage}$$

$$\overline{MER} = (MER_{Mean} - 3\sigma)$$

The computing device may the determine the bitload and bitload threshold according to the algorithms described above. For example:

$$Bitload_{Raw} = Log_2\left(1 + 10^{\frac{MER}{10}}\right)$$

$$Bitload = floor(Bitload_{Raw})$$

$$BitloadThreshold\ \% = (Bitload_{Raw} - Bitload) * 100$$

The computing device may compare the calculated bitload threshold with a set bitload threshold (e.g., a predetermined threshold). Based on the comparison, the computing device may determine whether to leave the bitload according to the floor function or to decrease the bitload by 1. The following presents exemplary pseudo code for the comparison:

```
if(BT < SBT) {
    Bitload = Bitload -1; // Decrease Bitload by 1
} else if (BT >= SBT) {
    Bitload = Bitload; // No Change
}
```

Once the bitload is determined, the computing device may calculate the modulation order (and consequentially the modulation profile) as follows:

$$\text{Modulation Order} = 2^{Bitload}$$

An example for a subcarrier range will now be provided. Assume that the $\overline{MER}$=36.5 dB. The computing device may determine the following:

$$Bitload_{Raw} = Log_2\left(1 + 10^{\frac{36.5}{10}}\right) = 12.12$$

$$Bitload = floor(12.12) = 12$$

$$BitloadThreshold\ \% = (12.12 - 12) * 100 = 12\%$$

In this example, assume that the predetermined bitload threshold is 5%. The computing device may determine to maintain the bitload at 12 because the calculated bitload threshold is not less than the predetermined bitload threshold. Accordingly, the modulation order may be calculated as 4096 QAM.

As previously described, the user device may calculate the modulation order and send the suggested modulation order to a network management server. The network management server may receive suggested modulation orders from a plurality of devices and recalculate the modulation orders if necessary.

The various features described above are merely non-limiting examples, and can be rearranged, combined, subdivided, omitted, and/or altered in any desired manner. For example, features of the computing device (including the remote control device and the terminal device) described herein can be subdivided among multiple processors and computing devices. The true scope of this patent should only be defined by the claims that follow.

We claim:

1. A method comprising:
   receiving, from one or more user devices, a plurality of signal quality measurements for a plurality of subcarriers used to transmit data to or receive data from the one or more user devices;
   determining, by a computing device, a first standard deviation of at least a portion of the plurality of signal quality measurements corresponding to a first group of subcarriers comprising at least a portion of the plurality of subcarriers;
   determining, based on a comparison of the first standard deviation to a threshold standard deviation, a second deviation for a second group of subcarriers comprising less than all of the subcarriers of the first group;

determining, based on a comparison of the second standard deviation to the threshold standard deviation, a modulation order for the second group of subcarriers; and sending, to at least one of the one or more user devices, an indication of the modulation order.

2. The method of claim 1, wherein the plurality of signal quality measurements comprises a plurality of modulation error ratio (MER) measurements.

3. The method of claim 1, wherein the modulation order comprises a first modulation order, the method further comprising:

determining, based on the first standard deviation, skewed data, associated with at least one of the plurality of subcarriers, that has a skew that satisfies a skew threshold; and determining a second modulation order for the at least one of the plurality of subcarriers associated with the skewed data, wherein the second modulation order is different from the first modulation order.

4. The method of claim 1, wherein the plurality of subcarriers comprise at least a part of a same channel.

5. The method of claim 1, wherein the plurality of subcarriers comprises a plurality of contiguous subcarriers, the method further comprising:

prior to determining the second standard deviation, removing, by the computing device, one or more of the plurality of contiguous subcarriers from consideration for the modulation order, wherein determining the second standard deviation comprises determining the second standard deviation with the one or more of the plurality of contiguous subcarriers removed, and wherein the comparison of the second standard deviation to the threshold standard deviation comprises a comparison of the second standard deviation, with the one or more of the plurality of contiguous subcarriers removed, to the threshold standard deviation.

6. The method of claim 1, wherein the plurality of signal quality measurements comprises one or more of a plurality of receive power measurements or a plurality of transmit power measurements.

7. The method of claim 6, further comprising:

using the one or more of the plurality of receive power measurements or the plurality of transmit power measurements to determine an initial modulation order for at least one user device of the one or more user devices.

8. The method of claim 6, further comprising:

using the one or more of the plurality of receive power measurements or the plurality of transmit power measurements to detect that a component of a user device of the one or more user devices has malfunctioned and to assign a new modulation order to the user device.

9. The method of claim 1, wherein determining the modulation order comprises determining the modulation order based on a bitload and a modulation error ratio (MER).

10. A method comprising:

determining, by a computing device, a plurality of signal quality measurements for a plurality of subcarriers used to transmit data to or receive data from the computing device;

determining, by the computing device, a standard deviation of at least a portion of the plurality of signal quality measurements corresponding to a first group of subcarriers comprising at least a portion of the plurality of subcarriers;

determining a first modulation order for the first group of subcarriers; and based on sending an indication of the first modulation order, receiving, by the computing device, an indication of a second modulation order for a second group of subcarriers comprising less than all of the subcarriers of the first group.

11. The method of claim 10, wherein the first modulation order is the same as the second modulation order.

12. The method of claim 10, wherein the first modulation order is different from the second modulation order.

13. The method of claim 10, wherein determining the first modulation order is performed based on a determination that a signal quality performance indicator has changed at the computing device.

14. An apparatus comprising:

one or more processors; and memory storing instructions that, when executed by the one or more processors, cause the apparatus to:

receive, from one or more user devices, a plurality of signal quality measurements for a plurality of subcarriers used to transmit data to or receive data from the one or more user devices;

determine a first standard deviation of at least a portion of the plurality of signal quality measurements corresponding to a first group of subcarriers comprising at least a portion of the plurality of subcarriers;

determine, based on a comparison of the first deviation to a threshold standard deviation, a second standard deviation for a second group of subcarriers comprising less than all of the subcarriers of the first group;

determine, based on a comparison of the second standard deviation to the threshold standard deviation, a modulation order for the second group of subcarriers; and send, to at least one of the one or more user devices, an indication of the modulation order.

15. The apparatus of claim 14, wherein the plurality of signal quality measurements comprises a plurality of modulation error ratio (MER) measurements.

16. The apparatus of claim 14, wherein the modulation order comprises a first modulation order, and wherein the instructions, when executed by the one or more processors, cause the apparatus to:

determine, based on the first deviation, skewed data, associated with at least one of the plurality of subcarriers, that has a skew that satisfies a skew threshold; and determine a second modulation order for the at least one of the plurality of subcarriers associated with the skewed data, wherein the second modulation order is different from the first modulation order.

17. The apparatus of claim 14, wherein the plurality of subcarriers comprise at least a part of a same channel.

18. The apparatus of claim 14, wherein the plurality of subcarriers comprises a plurality of contiguous subcarriers, and wherein the instructions, when executed by the one or more processors, cause the apparatus to:

prior to determining the first standard deviation, remove one or more of the plurality of contiguous subcarriers from consideration for the modulation order, wherein determining the first standard deviation comprises determining the first standard deviation with the one or more of the plurality of contiguous subcarriers removed, and wherein the comparison of the first standard deviation to the threshold standard deviation comprises a comparison of the first standard deviation, with the one or more of the plurality of contiguous subcarriers removed, to the threshold standard deviation.

19. The apparatus of claim 14, wherein the plurality of signal quality measurements comprises one or more of a plurality of receive power measurements or a plurality of transmit power measurements.

20. The apparatus of claim 19, wherein the instructions, when executed by the one or more processors, cause the apparatus to:
use the one or more of the plurality of receive power measurements or the plurality of transmit power measurements to determine an initial modulation order for at least one user device of the one or more user devices.

* * * * *

UNITED STATES PATENT AND TRADEMARK OFFICE
CERTIFICATE OF CORRECTION

PATENT NO. : 10,785,008 B2
APPLICATION NO. : 15/349523
DATED : September 22, 2020
INVENTOR(S) : Garcia et al.

It is certified that error appears in the above-identified patent and that said Letters Patent is hereby corrected as shown below:

In the Specification

Column 8, Detailed Description, Line 43:
Delete "terminal" and insert --termination-- therefor Column 23, Detailed Description, Line 8:
Delete "33K" and insert --32K-- therefor In the Claims Column 30, Claim 1, Line 66:
Before "deviation", insert --standard--

Column 32, Claim 14, Line 27:
Before "deviation", insert --standard--

Column 32, Claim 16, Line 43:
Before "deviation,", insert --standard--

Signed and Sealed this
Sixth Day of December, 2022

Katherine Kelly Vidal
*Director of the United States Patent and Trademark Office*